US007516148B2

(12) United States Patent
Waytena et al.

(10) Patent No.: US 7,516,148 B2
(45) Date of Patent: Apr. 7, 2009

(54) ASSIGNING AND MANAGING PATRON RESERVATIONS FOR DISTRIBUTED SERVICES USING WIRELESS PERSONAL COMMUNICATION DEVICES

(75) Inventors: William Waytena, San Francisco, CA (US); Amir H. Raubvogel, Sunnyvale, CA (US); Robert R. Sachs, San Mateo, CA (US)

(73) Assignee: PalmTop Productions, Inc., Brooklyn, NY (US)

(*) Notice: Subject to any disclaimer, the term of this patent is extended or adjusted under 35 U.S.C. 154(b) by 584 days.

(21) Appl. No.: 10/860,846

(22) Filed: Jun. 3, 2004

(65) Prior Publication Data

US 2004/0225540 A1 Nov. 11, 2004

Related U.S. Application Data

(63) Continuation of application No. 09/431,331, filed on Nov. 1, 1999, now Pat. No. 6,748,364, which is a continuation of application No. 08/845,504, filed on Apr. 24, 1997, now Pat. No. 5,978,770.

(51) Int. Cl.
*G06F 17/00* (2006.01)

(52) U.S. Cl. ............................... 707/102; 707/3; 705/1; 705/5

(58) Field of Classification Search ................. 707/102, 707/3; 705/5, 1
See application file for complete search history.

(56) References Cited

U.S. PATENT DOCUMENTS

| | | | | |
|---|---|---|---|---|
| 4,298,793 | A | 11/1981 | Melis et al. | |
| 5,006,983 | A | 4/1991 | Wayne et al. | |
| 5,502,806 | A | 3/1996 | Mahoney et al. | |
| 5,541,835 | A * | 7/1996 | Dextraze et al. | 705/10 |
| 5,541,839 | A | 7/1996 | Mitzkus et al. | |
| 5,978,770 | A | 11/1999 | Waytena et al. | |
| 6,282,487 | B1 | 8/2001 | Shiomi et al. | |
| 6,529,786 | B1 | 3/2003 | Sim | |
| 6,748,364 | B1 * | 6/2004 | Waytena et al. | 705/5 |

FOREIGN PATENT DOCUMENTS

WO WO 97/18534 5/1997

* cited by examiner

*Primary Examiner*—Sana Al-Hashemi
(74) *Attorney, Agent, or Firm*—Fenwick & West LLP

(57) ABSTRACT

A system and method for assigning and managing patron reservations to one or more of a plurality of attractions receive reservation requests at personal communication devices (PCDs). Reservation requests are transmitted to a computer associated with the selected attraction, which determines a proposed reservation time based on information describing the attraction, the patron, previously-made reservations maintained in a virtual queue, and the current state of a physical queue associated with the attraction. Proposed reservation time is transmitted to the PCD for confirmation or rejection by the patron. Confirmed reservations are entered in the virtual queue. Patrons are alerted by the PCD when their reservation time is approaching.

13 Claims, 15 Drawing Sheets

202

| Guest # (227) | Name (220) | Age (221) | Sex (222) | Height (223) | Weight (224) | Flags (225) |
|---|---|---|---|---|---|---|
| 1 | Tom | 34 | M | 69 | 165 | 16FE |
| 2 | Patty | 26 | F | 62 | 129 | FA23 |
| 3 | Anthony | 17 | M | 70 | 149 | 53D2 |
| 4 | Dawn | 13 | F | 59 | 105 | 3323 |
| 5 | ... | | | | | |
| 6 | | | | | | |

226 (rows 1–6)

| | | |
|---|---|---|
| 423 | Attraction ID | 1005594 |
| 231 | Name | Dragon Mountain |
| 232 | Ptr. to Desc. | F02871 |
| 237 | Age (min, max) | 6, 12 |
| 238 | Height (min, max) | 36, 60 |
| 239 | Weight (min, max) | 40, 130 |
| 233 | Location (x,y) | 2110, 2339 |
| 234 | Operating Hours | 10:00 – 20:00 |
| 261 | Cycle Capacity | 18 |
| 262 | Est. Throughput | 120 |
| 263 | Est. Downtime | 5 |
| 265 | Nominal Staff | 6 |
| 266 | Current Status | OPERATING |
| 267 | Curr. Throughput | 108 |
| 268 | Curr. Staff | 6 |
| 269 | Today's Throughput | 116 |
| 270 | Today's Downtime | 0 |
| 264 | Flags | FEF1 |

| Attraction ID (423) | Name (231) | Ptr to Description (232) | Age (min, max) (237) | Height (min, max) (238) | Weight (min, max) (239) | Location (x,y) (233) | Operating Hours (234) | Flags (235) |
|---|---|---|---|---|---|---|---|---|
| 1005678 | Water Flume | F0034E | 8, 65 | 54, 84 | 90, 250 | 1521, 1122 | 10:00–16:00 | 1A22 |
| 1004629 | The Rat | F012E4 | 8, 65 | 54, 84 | 50, 250 | 422, 98 | 10:00–18:00 | A113 |
| 1006689 | Time Travel | F01AB2 | 8, 65 | 48, 84 | 50, 250 | 334, 95 | 10:00–20:00 | FF59 |
| 1005594 | Dragon Mountain | F02871 | 6, 12 | 36, 60 | 40, 130 | 2110, 2339 | 10:00–20:00 | FEF1 |
| 1009813 | Pyramid Drop | F0301A | 8, 65 | 54, 84 | 90, 250 | 1123, 1339 | 10:00–20:00 | 586C |
| ... | ... | | | | | | | |

| Request ID (422) | Attraction ID (423) | Time (241) | Who (242) | Flags (243) |
|---|---|---|---|---|
| 4170001 | 1005594 | 12:15 | 1,2,3,4 | 100F |
| 4170002 | 1009813 | 13:00 | 1,2 | 104C |
| 4170003 | 1004629 | 13:05 | 3,4 | 108E |
| ... | ... | | | |

| Record # (251) | Request ID (422) | PCD ID (421) | Time (241) | # of patrons (252) | Who (242) | Flags (243) | Ride Probability (253) |
|---|---|---|---|---|---|---|---|
| ... | | | | | | | |
| 8134 | 3860006 | 100386 | 12:10 | 5 | 1,2,3,4,5 | A100 | 91 |
| 8135 | 4170001 | 100417 | 12:15 | 2 | 1,2 | 100F | 83 |
| 8136 | 2910062 | 100291 | 12:17 | 3 | 1,3,4 | 1159 | 52 |
| 8137 | 4990010 | 100499 | 12:20 | 6 | 1,2,3,4,5,6 | 998A | 65 |
| 8138 | 1090026 | 100109 | 12:26 | 2 | 2,4 | 16CB | 83 |
| 8139 | 5060003 | 100506 | 12:45 | 2 | 1,2 | 669D | 83 |
| ... | ... | | | | | | |

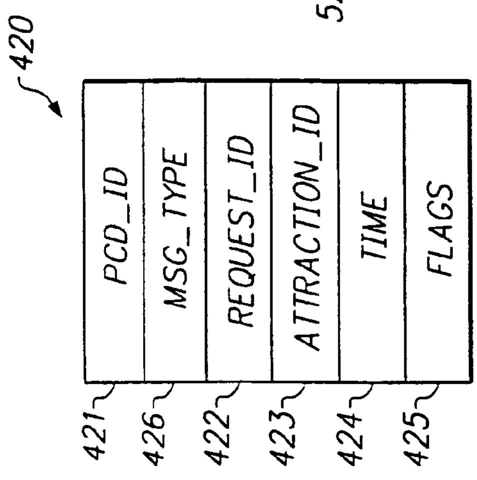

FIG. 4A

| | |
|---|---|
| 421 | PCD_ID |
| 426 | MSG_TYPE |
| 422 | REQUEST_ID |
| 423 | ATTRACTION_ID |
| 424 | TIME |
| 425 | FLAGS |

420

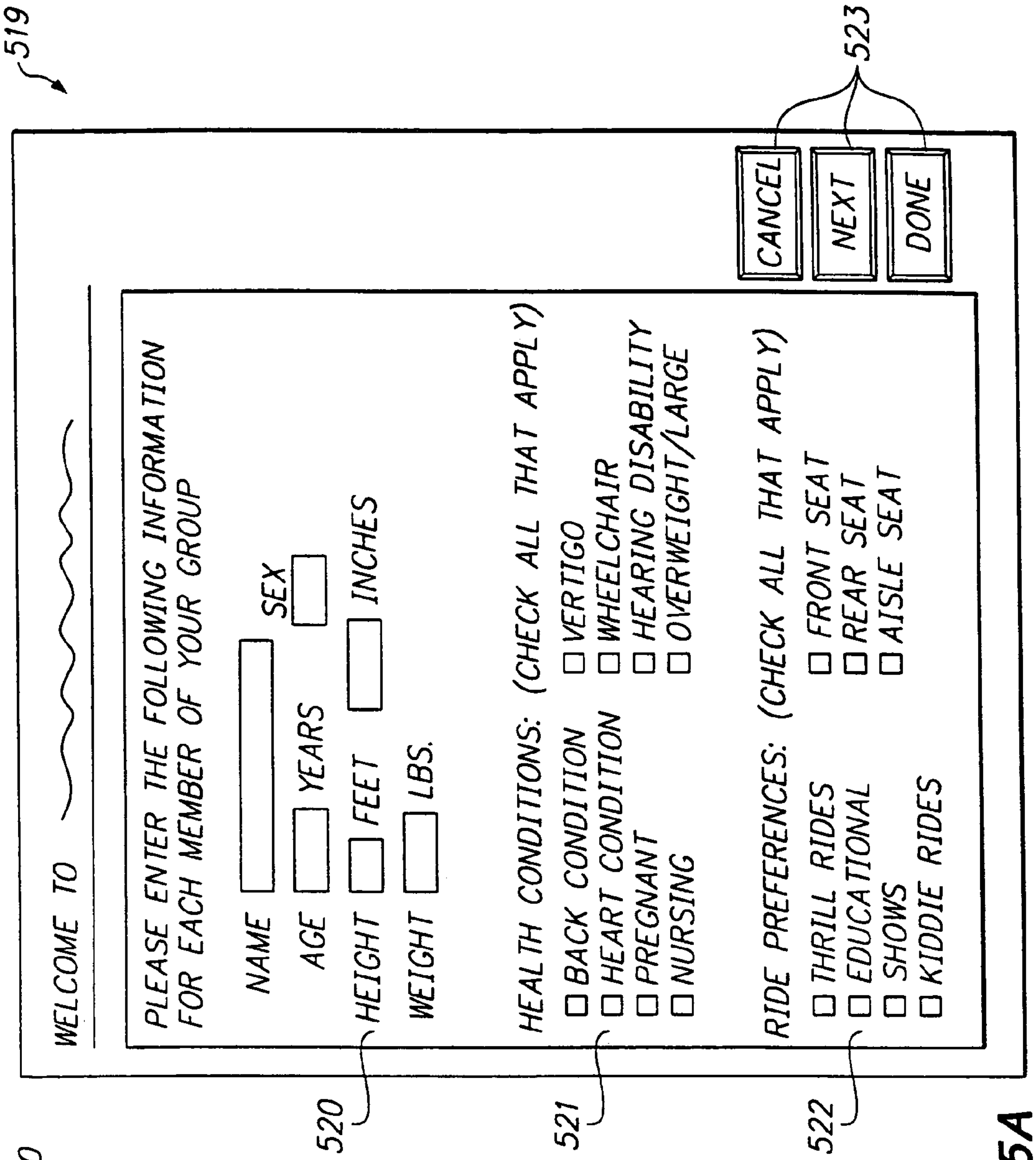

WELCOME TO ~~~~~~

PLEASE ENTER THE FOLLOWING INFORMATION FOR EACH MEMBER OF YOUR GROUP

NAME [____]
AGE [__] YEARS    SEX [_]
HEIGHT [__] FEET [__] INCHES
WEIGHT [__] LBS.

520

HEALTH CONDITIONS: (CHECK ALL THAT APPLY)
☐ BACK CONDITION   ☐ VERTIGO
☐ HEART CONDITION  ☐ WHEELCHAIR
☐ PREGNANT         ☐ HEARING DISABILITY
☐ NURSING          ☐ OVERWEIGHT/LARGE

521

RIDE PREFERENCES: (CHECK ALL THAT APPLY)
☐ THRILL RIDES     ☐ FRONT SEAT
☐ EDUCATIONAL      ☐ REAR SEAT
☐ SHOWS            ☐ AISLE SEAT
☐ KIDDIE RIDES

522

[CANCEL] [NEXT] [DONE]  523

Attraction Computer 101
State Diagram

ASSIGNING AND MANAGING PATRON RESERVATIONS FOR DISTRIBUTED SERVICES USING WIRELESS PERSONAL COMMUNICATION DEVICES

This application is a continuation of U.S. application Ser. No. 09/431,331, filed Nov. 1, 1999, now U.S. Pat. No. 6,748,364, which is a continuation of U.S. application Ser. No. 08/845,504, filed Apr. 24, 1997, now U.S. Pat. No. 5,978,770, both of which are incorporated by reference in their entirety.

BACKGROUND

1. Field of Invention

The present invention relates to scheduling patron reservations in facilities offering numerous attractions, and more particularly, to systems, methods, and apparatuses for assigning and managing reservations using wireless personal communication devices.

2. Background of Invention

One of the most difficult problems to solve in the design and operation of amusement parks is managing the queuing of patrons for rides and other attractions. Conventionally, each attraction has one physical line, or queue, in which patrons wait. Lines for very popular attractions can last many hours, during which the customer merely shuffles along until finally admitted to the attraction. Since a patron can only be in one line at a time, a great deal of time may be lost merely standing in line for attractions. Such conventional approaches inherently misallocate patrons to attractions; while standing in line for one attraction, there may be little or no line for another attraction that the patron is interested in attending. Yet, the patron cannot be in both lines at once, and so the patron unfortunately waits in the one line for the first attraction, and then, perhaps much later goes to the second attraction, only to find that it now has a significant line.

To ease this situation, amusement parks go to great lengths to design distractions where the line forms, often snaking the line through various structures to conceal the true length of the line, or providing various amusements to the patrons in line. Obviously, this approach does not solve the misallocation problem. Fundamentally, the more time patrons spend standing in line, the less time they have to ride or see other attractions, and the less time they have to purchase concessions. Furthermore, patrons find it frustrating to spend an overwhelming proportion of their day standing in lines rather than enjoying the attractions. Thus, it is desirable to reduce the time patrons stand in line for attractions, rides, amusements, and other services.

The misallocation problem results in part from two constraints. The first constraint is the inability of patrons to queue in more than one line at a time. The second constraint is a lack of communication: first, an inability of patrons to communicate their intention to attend particular attractions, and in effect, request a reservation for an attraction; and second, an inability to inform patrons remotely when their reservation is available for the attraction.

Systems for scheduling and queuing patrons or customers are known. Conventionally, many of these systems attempt to allocate patrons to typically one, though sometimes several, services or service providers. In many conventional systems, there is some central management of the queuing and scheduling process. For example, well-known service systems, such as used in delicatessens, banks, or the like, employ a ticketing device that provides customers with numbered tickets, effectively creating a single queue, and then servers serve the next person in the queue. Variations of these systems use a main queue and direct customers from the main queue to individual queues for individual services, which may be priority queues. Systems such as these are impractical when applied to amusement parks, given the large number of attractions, the vast number of patrons, and the geographic dispersion of the park. Hence the use of simple queues at each attraction has been the long-standing model of amusement park design.

Conventional systems now even include pagers to page customers as to when a service or service provider is available. In these pager-based systems, the pager is merely used as a notification device, and provides no utility to allow the customer to reserve or schedule service. Rather, the pagers are used merely to notify the patron that a server is available. The patron still signs up for service in conventional manner, such as through a receptionist, and then is provided a pager. These systems are thus inapplicable to the amusement park model because they do not allow patrons to signal or reserve an attraction ahead of time, or to obtain information about waiting times for attractions. Further, unlike amusement parks where the patron intends to visit numerous attractions and amusements over an entire day, conventional pager-based systems are designed for a single service per patron. Once the service is provided, the patron returns the pager and leaves the premises.

Another problem with conventional systems is that the patron views the time spent in line as an investment. If an attraction malfunctions, or if some other factor necessitates a delay or cancellation of the patron's place in line, the patron typically feels extremely disappointed and frustrated at having wasted a significant amount of time in line. Therefore, it is advantageous to be able to inform patrons remotely when there is a problem with an attraction, perhaps even before a reservation is made for the attraction.

Accordingly, it is desirable to provide systems, methods, and apparatuses that allows patrons to obtain information about waiting times for various attractions, amusements, or services throughout an amusement park or other service area, make reservations for certain ones of these, be alerted when a desired attraction becomes available, and be updated when changes are made to reservations. Furthermore, it is desirable to allow a patron to effectively "wait" in line while engaging in other activities in the park—such as purchasing concessions or attending other attractions—so that the time spent waiting is otherwise productive, thus reducing the feeling of having wasted time when delays or malfunctions occur.

SUMMARY OF THE INVENTION

In accordance with one aspect of the present invention, there is provided a system that allows patrons in an amusement park or other facility to schedule reservations in queues for attractions and other services. In one embodiment of the system, there is provided a plurality of hand-held, wireless personal communication devices (PCDs), and a plurality of attraction computers, each associated with one of the attractions. The attraction computers and the PCDs communicate with one another over a wireless network to manage the scheduling of reservations. A central attraction control interface permits amusement park staff to monitor and modify the reservation information for the various attractions.

A group of patrons, such as a family, entering the park is given one or more PCDs. Each PCD includes a screen display for displaying text and graphic information as well as an input device for receiving input from the patron using the device. Each PCD stores information identifying the number of individuals in the patron's group, as well as relevant characteristics of the individuals, such as age and height, for example. These factors are typically entered by the patron when he or she first receives the device; the factors may be relevant in determining whether reservation requests for particular attractions are valid, given particular physical restrictions of various attractions.

The PCDs communicate with the attraction computers through a wireless communication network; accordingly the PCDs and attraction computers each include both transmitter and receiver components for bi-directional communication of data. In one embodiment, the system also includes a plurality of communication receivers and transmitters located throughout the amusement park for facilitating communication between the PCDs and the attraction computers.

A PCD receives user input from the patron requesting a reservation for a particular attraction. The reservation is filtered by the PCD to determine its validity. If the request is valid, it is transmitted to the corresponding attraction computer via the wireless network. The attraction computer processes the incoming reservation request to determine whether and when the reservation can be accommodated. A proposed reservation time is provisionally stored in a virtual queue and transmitted back to the PCD for confirmation or rejection by the patron. If the patron elects to confirm the proposed reservation time, the PCD transmits a confirmation message to the attraction computer which confirms the reservation in the virtual queue. If the patron rejects the reservation or does not confirm it within a predetermined time period, the reservation is removed from the virtual queue and the proposed reservation time is released so that it may be made available to other patrons.

Updates to reservation times may be required due to problems with attractions or other unforeseen circumstances. If necessary, the attraction computer may transmit an alert message to the PCD to inform the patron of a change to his or her reservation time. The patron may then be given the opportunity to accept the new reservation time, reschedule, or cancel the reservation. In addition, patrons may initiate changes or cancellations to reservations which result in further updates to the queues stored at attraction computers.

When a reserved time is approaching, the PCD in one embodiment alerts the patron to remind him or her to proceed to the attraction. This alert may take the form of an audible message or beep, a visual indication on the screen, or a vibration as is conventionally used in pager systems. Some combination of these techniques may also be used. The patron has the opportunity to cancel the reservation at any time if desired. If the reservation is not canceled, the patron proceeds to the attraction, where a sensor detects the patron's entry, and updates the stored virtual queue accordingly. The continual monitoring of patrons arriving at the attraction, and updating of the virtual queue enables the attraction computer to dynamically determine future reservation times for other patrons. The attraction computer maintains data on the numbers of patrons, reservations times, cancellations and the like, to provide reports to the staff.

The present invention is designed to operate in conjunction with conventional physical queues as well. Thus, in one embodiment, for a particular attraction, there is typically a physical queue (line) in addition to the stored virtual queue in the attraction computer. Persons in the physical queue are admitted on a regular basis, and in confluence with those patrons arriving at the attraction who previously made an electronic reservation. The scheduling of advance reservations takes into account the presence of patrons in the physical queue, so that a certain number of such patrons may be admitted between admissions of patrons from the virtual queue. The management of the virtual queue can therefore be adjusted as desired to balance admissions by patrons in the physical queue with respect to admissions by patrons in the virtual queue.

BRIEF DESCRIPTION OF THE DRAWINGS

FIG. 2A is a diagram of sample patron information records.

FIG. 2B is a diagram of sample attraction description records.

FIG. 2C is a diagram of sample local reservation records.

FIG. 2D is a diagram of sample virtual queue records.

FIG. 2E is a diagram of a sample attraction information record.

FIG. 4A is a data structure for messages according to the present invention.

FIG. 5A is a sample screen for entry of information describing a patron and his or her group according to the present invention.

DETAILED DESCRIPTION OF THE INVENTION

For illustrative purposes, the description which follows describes an embodiment of the present invention with reference to an amusement park containing a number of attractions such as rides. The present invention may also be applied to other environments involving patron reservations for distributed services, such as for example, shows, restaurants, sporting events, and the like. The terms used herein are for illustrative purposes only and should not be construed as limiting the scope of the invention as defined in the claims.

System Architecture

Figure 1:
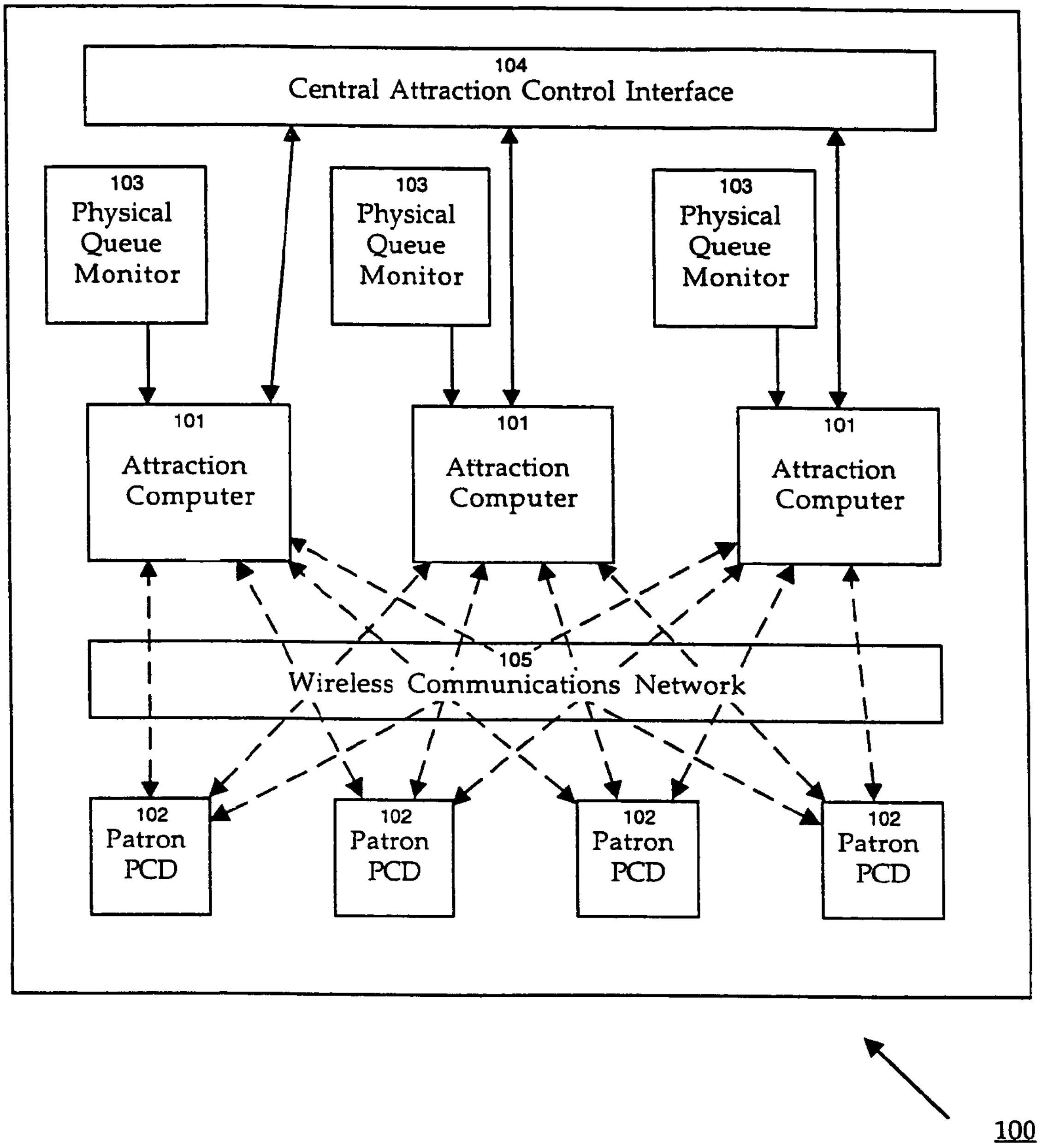
FIG. 1 is a block diagram of a system according to the present invention.

Referring now to FIG. 1, there is shown a block diagram of a reservation system 100 according to the present invention. A plurality of attraction computers 101 is provided, each associated with a particular attraction. In one embodiment these attraction computers are implemented as components of a single computer system or group of computer systems. Each component may be a distinct processor or processing node within the computer or group. In another embodiment, each attraction computer is implemented as a separate computer and may be physically disposed at or near its associated attraction.

Figure 1A:
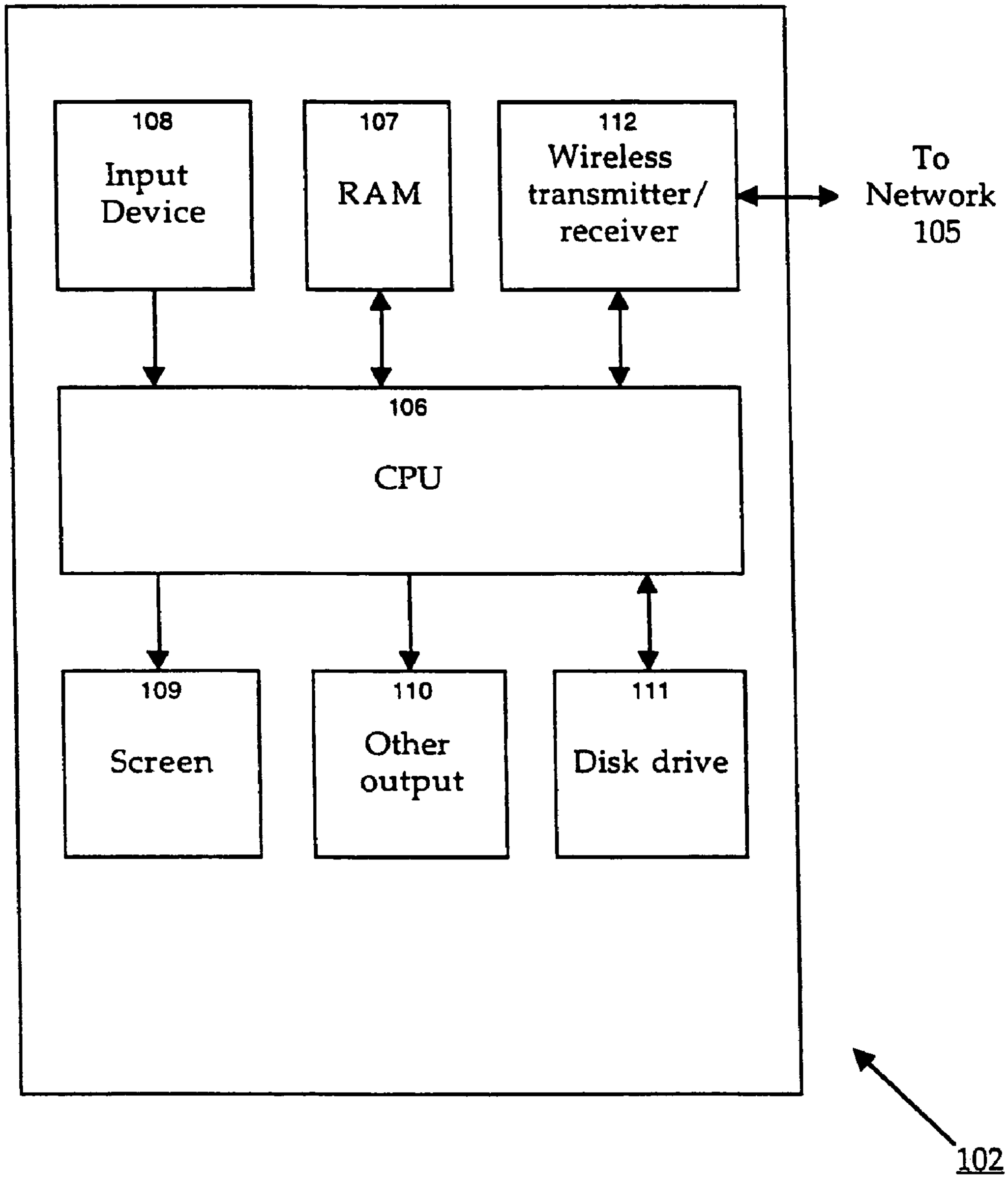
FIG. 1A is a block diagram of hardware architecture of a personal communication device according to the present invention.
Figure 1B:
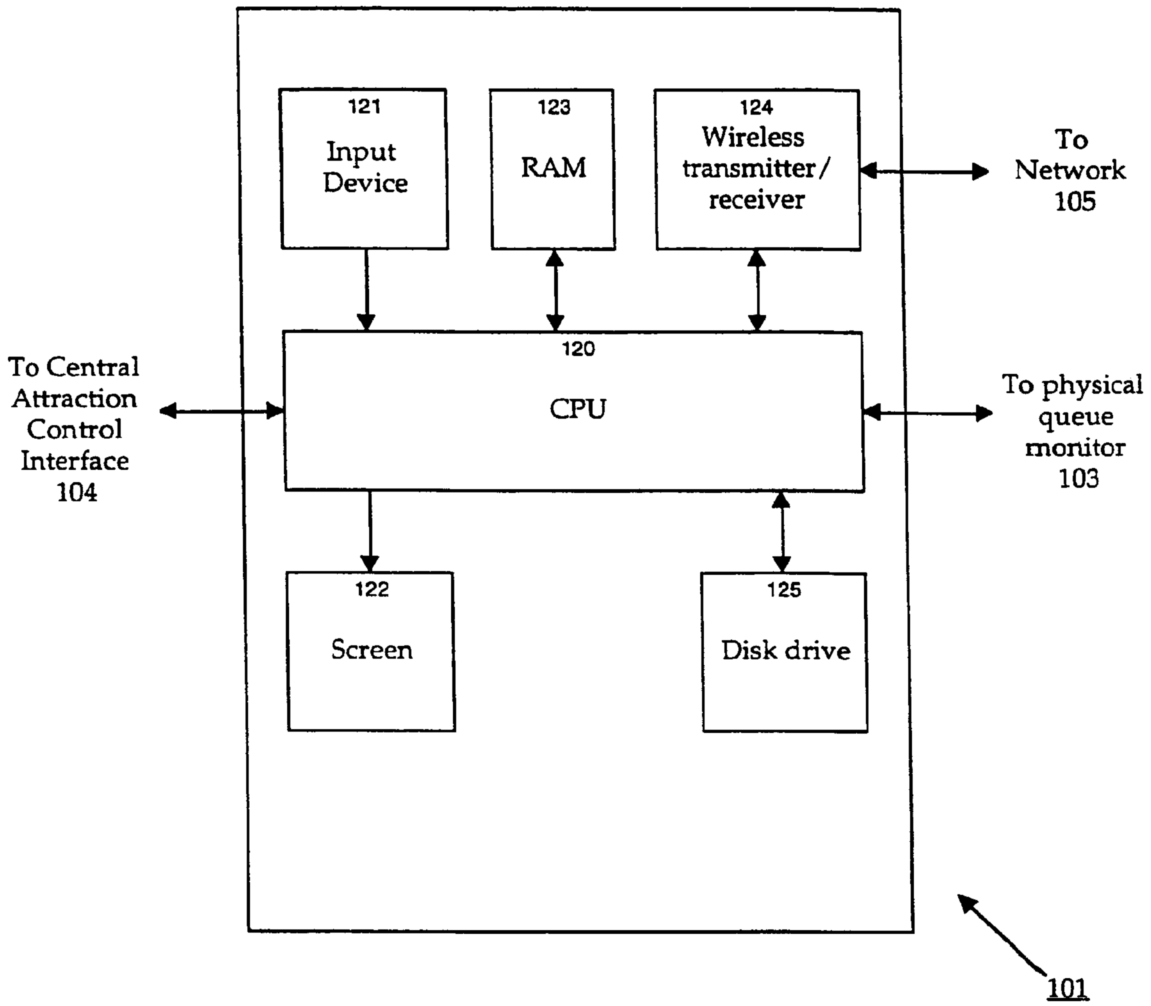
FIG. 1B is a block diagram of hardware architecture of an attraction computer according to the present invention.

Referring also to FIG. 1B, there is shown the hardware architecture for an implementation of attraction computer 101. Attraction computers 101 are implemented using conventional computer systems, including a microprocessor or central processing unit (CPU) 120, random-access memory (RAM) 123, disk storage 125, input device 121 such as keyboard and/or mouse, output device such as display screen 122. Attraction computers 101 are programmed with specific software to operate in accordance with the present invention. A suitable attraction computer 101 for use at an individual attraction may be implemented using an IBM PC compatible computer, with an Intel Pentium™ processor, using Microsoft Windows 95 or Windows NT operating systems. A suitable attraction computer 101 may be implemented as a component of a single computer system using an IBM AS400 computer system. Attraction computers 101 also contain wireless communication hardware 124 for transmission and reception of data to other components of system 100 over a wireless communications network 105, as will be described in more detail below.

Each attraction computer 101 maintains information describing the associated attraction, including general static information such as the attraction's capacity, throughput, description of the attraction, height and weight requirements for patrons, geographic location, hours of operation, and the like. In addition, attraction computer 101 maintains information describing the current state and reservation status of the attraction, as will be described more fully below. In one embodiment of the present invention, each attraction computer 101 is associated with a physical queue monitor 103 which monitors the current state of the physical queue for the corresponding attraction, wherein patrons physically line up and wait for admission to the attraction. In one embodiment, monitor 103 is implemented using a series of photoelectric cells to determine the physical position of the end of the line in order to estimate the number of people in the physical queue. In another embodiment, monitor 103 is implemented using a turnstile to count the number of patrons entering the physical queue. In yet another embodiment, monitor 103 is implemented by manually counting or estimating the number of people in the line and providing this information as an input to attraction computer 101. By keeping track of how many people are in the physical queue for the attraction, attraction computer 101 is able to more accurately estimate current and future availability of the attraction for purposes of making electronic reservations.

System 100 also includes a plurality of personal communication devices (PCDs) 102, each associated with a patron or group of patrons visiting the park. In one embodiment, PCDs 102 are implemented as shown in FIG. 1A, using conventional, small, hand-held portable computers including a rechargeable battery (not shown), microprocessor or CPU 106, display screen 109, auxiliary output device 110 such as audio speaker or vibration mechanism, input device such as a pen-based input device 108, RAM 107, and storage device such as a disk drive 111. PCDs 102 may be implemented, for example using Casio Zoomer™ personal digital assistant (PDA), U.S. Robotics' Pilot™ PDA, Apple Computer's Newton 120 PDA, Hewlett-Packard's OmniGo 1000 PDA, and the like. PCDs 102 are programmed with specific software to configure them to operate in accordance with the present invention. PCDs 102 also include wireless communication hardware 112 for transmission and reception of data to other components of system 100 over wireless communications network 105, as will be described more fully below. PCDs 102 communicate with attraction computers 101, as indicated by dashed lines in FIG. 1, to transmit reservation requests, receive proposed reservation times, and transmit reservation confirmations, as will be described below.

Central attraction control interface 104 is implemented in one embodiment as a conventional centralized computer system allowing access to all attraction computers 101 by park staff. Interface 104 facilitates monitoring of virtual and physical queues for all attractions, as well as reservation schedules and other information describing the state of the attractions. Interface 104 also allows park staff to manually change the data describing any of the individual attractions, such throughput estimates, hours of operation, reservation schedules, attraction information, and any other information stored in attraction computers 101, as needed. This may be useful, for example, when a particular attraction is functioning at lower than usual capacity due to some unforeseen factors, or when the hours of operation of an attraction are changed.

Wireless communications network 105 transmits messages between communication hardware 124 of attraction computers 101 and communication hardware 112 of PCDs 102. Network 105 may be implemented using any of a number of known wireless technologies, including for example infrared, conventional point-to-point radio transmission, conventional cellular/paging networks, or any combination thereof. It will be apparent to those skilled in the art that the particular technology that may be optimal for a particular application will depend upon several factors, including performance, environment, scale, cost, and the like. In one exemplary embodiment, network 105 is implemented using an ARDIS Nationwide network, available from wide-area wireless data service providers such as Motorola or RAM Mobile Data. In alternative embodiments, network 105 is implemented using a RICOCHET™ wireless modem/Internet connection from Metricom, or a Dayna "Roamer" wireless local area network. In yet another embodiment, network 105 is implemented using conventional off-the-shelf products such as a Radio-Modem from DataRadio for direct point-to-point data communications integrated with an infrared receiver/transmitter for locations where radio communication is impractical or inappropriate.

Although FIG. 1 shows three attraction computers 101 and four patron PCDs 102, there may be any number of each of such elements, depending on the nature of the park, the number of patrons attending, and other factors.

Software Architecture

Figure 2:
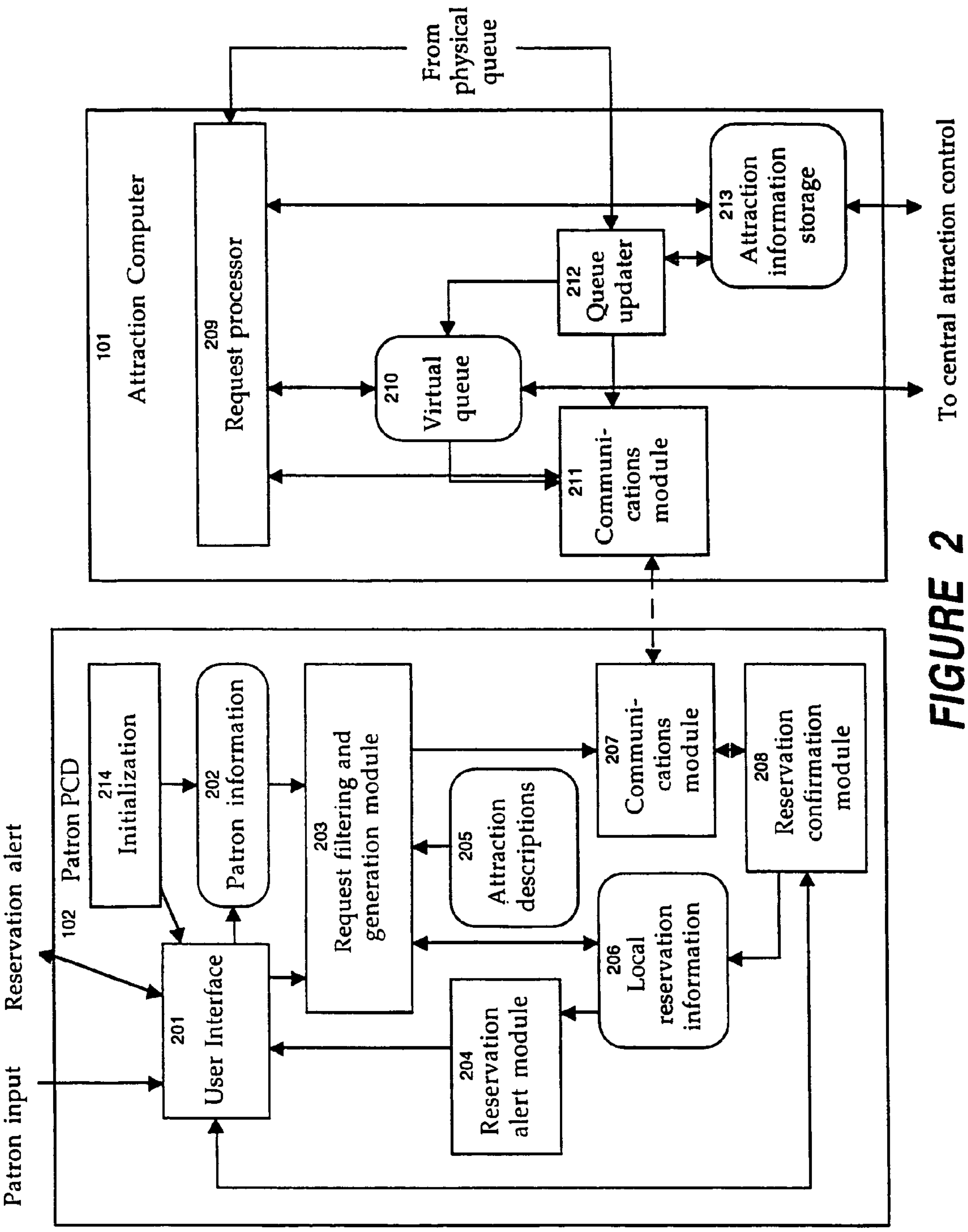
FIG. 2 is a block diagram of software architecture of a personal communication device and an attraction computer according to the present invention.

Referring now to FIG. 2, there is shown a block diagram of the software architecture of an attraction computer 101 and a PCD 102. PCD 102 contains a user interface component 201 for receiving input from a patron and for displaying information to the patron. In one embodiment, user interface 201 is implemented in graphic form with on-screen commands, buttons, menu items, and text input boxes, operable by either a touch-sensitive screen 109 or pen-based pointing device 108. Upon initial entry into the park, and payment of a rental fee if necessary, the patron is provided with a PCD 102. Upon activation, PCD 102 executes an initialization module 214 that prompts the patron via user interface 201 to input patron information describing his or her group, as is described below in connection with FIG. 5A. Such information is stored in patron information storage 202 which is a part of the random-access memory (RAM) 107 or magnetic storage (e.g. disk drive) 111 of the PCD 102.

Referring now also to FIG. 2A, there is shown a set of sample patron information records 226 stored in storage 202 according to an embodiment of the present invention. Each record 226 refers to a single member ("guest") of the patron's group, and contains the following fields:

- Guest number 227 identifies each member of the patron's group. This number is unique to each member within a particular group, so that in conjunction with PCD ID (described below), it identifies every guest in the park.
- Name 220 contains an ASCII string representing the guest's name (first and/or last). This field is used to specify in user interface 201 which guests are included in a reservation.
- Age 221 in years.
- Sex 222 may be represented by a binary digit.
- Height 223 in inches.
- Weight 224 in pounds.
- Flags 225 contains encoded information describing preferences and characteristics of the guest.

Age 221, height 223, weight 224, and flags 225 are used by filtering module 203 to determine validity of reservation requests, as described below. Other types of information may also be provided in records 226 as may be useful in performing the functions of the present invention. Storage 202 may also contain historical data describing performance of the patron's group in keeping reservations, for use by attraction computer 101 in estimating a probability that the patron will actually attend an attraction for which there is a confirmed reservation. In one embodiment, such data is encapsulated in a Ride Probability value, which is transmitted along with reservation requests as further described below. Ride probability represents an estimated probability that the patron will show up for the reservation, represented as a percentage. In one embodiment, it starts at a predefined amount and is dynamically estimated based on performance of the patron in keeping reservations. The probability of confirmation may be computed, for example, by dividing the number of reservations that the patron has confirmed or accepted, by the total number of reservations requested by the patron; other more sophisticated calculations may also be used, incorporating for example, time of day, location within park, distance to attraction, or other information.

PCD 102 optionally contains descriptions of the various attractions in the park, stored in attraction description storage 205, which is also implemented in RAM 107 or disk drive 111. It is advantageous to store such information locally within PCD 102 so that it can be accessed by the patron without necessitating communication with one or more of attraction computers 101 in order to obtain this information.

Referring now also to FIG. 2B, there is shown a set of attraction description records 236 stored in storage 205 according to an embodiment of the present invention. Each record 236 refers to a particular attraction in the park, and contains the following fields:

- Attraction ID 423 is a unique identification number that identifies the attraction. When reservation requests are generated, this number 423 enables the communications module to properly direct the request to the appropriate attraction computer 101.
- Name 231 contains an ASCII string representing the name of the attraction.
- Pointer to description 232 contains a pointer to a location in PCD memory containing text and/or graphic descriptions of the attraction. PCD 102 accesses the referenced memory location to display the attraction description to the patron.
- Age 237 specifies minimum and maximum ages for the attraction, in years.
- Height 238 specifies minimum and maximum heights for the attraction, in inches.
- Weight 239 specifies minimum and maximum weights for the attraction, in pounds.
- Location 233 specifies the location of the attraction in the park. In one embodiment, this is specified in grid coordinates to some useful level of resolution, such as 10 meters. Other forms of location data may also be used, such as Global Positioning System (GPS) coordinates, and the like.
- Operating hours 234 of the attraction.
- Flags 235 contains encoded information describing other characteristics of the attraction as deemed useful for operation.

Age 237, height 238, weight 239, location 233, operating hours 234, and flags 235 are used by filtering module 203 to determine validity of reservation requests, as described below. Other information may also be provided in records 236 as may be useful in performing the functions of the present invention.

In one embodiment, request filtering and generation module 203 processes reservation requests for particular attractions by accessing patron information storage 202 and attraction description storage 205 as will be described below. The module 203 determines whether such reservations requests are valid, by applying predetermined filtering rules to the request for the attraction. These filtering rules may compare the patron description data to the attraction requirements to determine whether the patron is allowed to attend the attraction, whether the attraction is currently operating, and whether the patron has exceeded a limited number of reservations at various attractions, and the like. The module 203 preferably informs the user when a request is determined to be invalid. Module 203 is implemented as a software module running on CPU 106 in PCD 102.

In an alternative embodiment, module 203 does not perform any filtering, but sends all reservation requests to attraction computer 101. In this embodiment, all such filtering is performed in attraction computer 101. One advantage of this embodiment is that PCD 102 does not have to store and update dynamic information in attraction description information 205. Depending on the particular configuration and the nature of the amusement park and attractions, such a scheme may be preferable.

Communications module 207 of PCD 102 obtains valid requests from filtering and generation module 203. Module 207, in conjunction with communication drivers implemented in software, transmits the valid requests to wireless communication hardware 112 of PCD 102. Communication hardware 112 sends the message over wireless communications network 105 to wireless hardware 124 of attraction computer 101. Hardware 124, in conjunction with additional communication drivers implemented in software, delivers the requests corresponding to the selected attraction for the reservation to communications module 211 coupled to attraction computer 101.

Module 207 receives proposed reservation information from module 211 in a similar fashion, and also transmits confirmations of reservations back to module 211. Module 207 is implemented using wireless transmitter/receiver 112 and attendant software, as is well known in the art, so that the plurality of PCDs 102 and attraction computers 101 are linked by wireless communications network 105. As will be apparent to those skilled in the art, known buffering and handshaking protocols are employed as is conventional in communication drivers and hardware, to implement the above-described operation.

Reservation confirmation module 208 receives a proposed reservation time from an attraction computer 101, and presents the proposed reservation time to the patron for confirmation or rejection. Module 208 is implemented as a software module running on CPU 106 in PCD 102. Module 208 is coupled to user interface 201 to present the appropriate options to the patron and to receive the patron's response, which may including accepting or rejecting the reservation time, or requesting additional information.

Local reservation storage 206 maintains information describing pending and confirmed reservations for the patron. It is advantageous to maintain this information locally in PCD 102 so that reservation alerts and other operations may be performed without necessitating communication with an attraction computer 101. Storage 206 is implemented in RAM 107 of PCD 102 or in a magnetic storage such as disk drive 111. The reservation confirmation module 208 stores data describing confirmed and pending reservations in local reservation storage 206 in response to patron requests and confirmation via user interface module 201.

Referring now also to FIG. 2C, there is shown a set of local reservation records 244 stored in storage 206 according to an embodiment of the present invention. Each record 244 refers to a particular pending or confirmed reservation for the patron, and contains the following fields:

Request ID 422 is a unique identification number for the request generated by PCD 102. This enables PCD 102 to distinguish this specific request from others that the patron may have made or may make in the future, so as to enable correct identification of requests in the local reservation information storage 206, and handling of responses from attraction computer 101.

Attraction ID 423 is a unique identification number that identifies the attraction.

Time 241 of the reservation.

Who 242 specifies which guest numbers in the patron's group are included in the reservation. This cross-references to guest numbers 227 stored in 202.

Flags 243 contains encoded information describing other characteristics of the attraction, including for example a flag specifying whether the reservation is pending (awaiting response) or confirmed.

Other information may also be provided in records 244 as may be useful in performing the functions of the present invention.

Reservation alert module 204 alerts the patron when a reserved time is approaching, as described in detail below in connection with FIG. 5. Module 204 is implemented as a software module running on CPU 106 in PCD 102.

Attraction computer 101 contains a request processor 209 for processing reservation requests received by communications module 211, using information from virtual queue 210, attraction information storage 213, and physical queue monitor 103. Request processor 209 is implemented as a software module running on CPU 120 in attraction computer 102. Request processor 209 operates as described below in connection with the state diagram shown in FIG. 6.

Communications module 211 receives reservation requests from communications module 207 of PCD 102 over network 105. Module 211 also transmits proposed reservation information provided by request processor 209 to module 207 and receives confirmations of reservations from module 207. Module 211 is implemented using wireless transmitter/receiver 124 and attendant software as is well known in the art.

Virtual queue 210 maintains a list of pending and confirmed reservations for the attraction. Virtual queue 210 holds a varying number of reservations, each reservation having data identifying or describing the patron holding the reservation, and either a time or position for the reservation.

Referring now also to FIG. 2D, there is shown, as an example, a set of records 254 stored in virtual queue 210 according to an embodiment of the present invention. Each record 254 refers to a particular pending or confirmed reservation for the patron, and contains the following fields:

Record number 251 specifies the sequence of reservations for a particular attraction. It is also used as an index number for the records, starting at zero and continuing to N-1, where N is the total number of records.

Request ID 422 is a unique identification number for the reservation request as generated by PCD 102 that sent the request to the attraction computer 101.

PCD ID 421 uniquely identifies the PCD 102 that generated the reservation request.

Time 241 of the reservation proposed or confirmed for the reservation request.

Number of patrons 252 included in the reservation request. Alternatively, this value can be derived from who information 242.

Who 242 is an optional field for specifying which guest numbers in the patron's group are included in the reservation.

Flags 243 contains encoded information describing other characteristics of the attraction, including for example a flag specifying whether the reservation request is pending (awaiting response) or confirmed.

Ride probability 253 is an optional field representing an estimated probability that the patron will show up for the reservation, as described above. In one embodiment, PCD 102 transmits this information as part of a reservation request and this field is then stored in virtual queue 210. The usage of ride probability 253 is described below in connection with FIG. 7.

Other information may also be provided in records 244 as may be useful in performing the functions of the present invention.

Information in virtual queue 210 is updated by request processor 209 and is accessed by request processor 209 as needed. When requested, request processor 209 determines the next available time or position for a reservation from the virtual queue 210, as described below. Finally, central attraction control interface 104 is able to access virtual queue 210 so that park staff can monitor the reservation status for attractions and make adjustments and modifications when appropriate. Virtual queue 210 is preferably stored in RAM 123 and may be stored, or mirrored to magnetic storage such as disk drive 125 for fault tolerance. It is advantageous to organize virtual queue 210 as a linked list so that entries can be easily inserted and removed at any point in the queue. Alternatively, virtual queue 210 may be implemented in a relational database, or other suitable data store.

Queue updater 212 makes adjustments to virtual queue 210 when necessitated by changes in the status of the attraction. These changes in status may be reflected in information from physical queue monitor 103 (for example, a dramatic change in the number of people in the physical queue), or some other change to attraction information stored in storage 213 and updated by central attraction control interface 104. For example, a dramatic increase in the number of people in the physical queue, or a temporary malfunction in the attraction, may cause reservations in virtual queue 210 to be pushed back by some amount. Changes made by queue updater 212 are sent to PCDs 102 as necessary through communications module 211 so that patrons are made aware of any adjustments made to their schedule resulting from the changes. Queue updater 212 is implemented as a software module running on CPU 120 in attraction computer 102.

Attraction information storage 213 maintains current information describing the particular attraction associated with attraction computer 101. Referring now to FIG. 2E, there is shown a representative sample of the information that is stored in 213 in one embodiment, as follows:

- Attraction ID 423, name 231, pointer to description 232, age restrictions 237, height restrictions 238, weight restrictions 239, location 233, and operating hours 234, as described above in connection with storage 205.
- Cycle capacity 261 represents the maximum number of guests that can pass through the attraction as a unit, where applicable. For example, the attraction may employ a series of cars, each containing a fixed number of guests. The capacity of an individual car is then the cycle capacity.
- Estimated throughput 262 represents the estimated number of guests per hour that may be admitted to the attraction. Alternatively, storage 213 may contain an estimated number of cycles per hour, so that the number of guests per hour can be calculated.
- Estimated downtime 263 represents the estimated percentage of time the attraction will not be functioning, based on historical data.
- Nominal staff 265 represents the usual staffing requirement for the attraction.
- Current status 266 of the attraction, for example OPERATING, CLOSED, SCHEDULED MAINTENANCE, PAUSED, and the like.
- Current throughput 267 is a measure of the current number of guests per unit time (e.g. hour) being admitted to the attraction.
- Current staff 268 represents the number of employees currently staffing the attraction.
- Today's throughput 269 represents a historical average throughput throughout the day, measured as guests per hour.
- Today's downtime 270 represents the percentage of normal operating hours during which the attraction has not been functioning throughout the day.
- Flags 264 represent other information that may be useful in scheduling reservations.

Items 234 and 261 through 270 are used by request processor 209 in determining scheduling of reservations. Static information such as estimated throughput 262, cycle capacity 261, operating hours 234, and the like are entered during initialization of computer 101. Dynamic information such as current status 266, current staff 268, and the like may be updated manually through central attraction control interface 104, or updates may occur based on data from queue updater 212 and request processor 209. The information in storage 213 is provided as needed to request processor 209, queue updater 212, and central attraction control interface 104. Attraction information storage 213 is implemented in RAM 123 or in magnetic storage such as a disk drive 125.

The preceding list is merely illustrative. Other items might be stored in 213 in addition to or in lieu of the listed items, as may be appropriate for the particular attractions. Also, other units or means of measuring the listed items might be employed in other embodiments of the present invention.

System Operation

Figure 3:
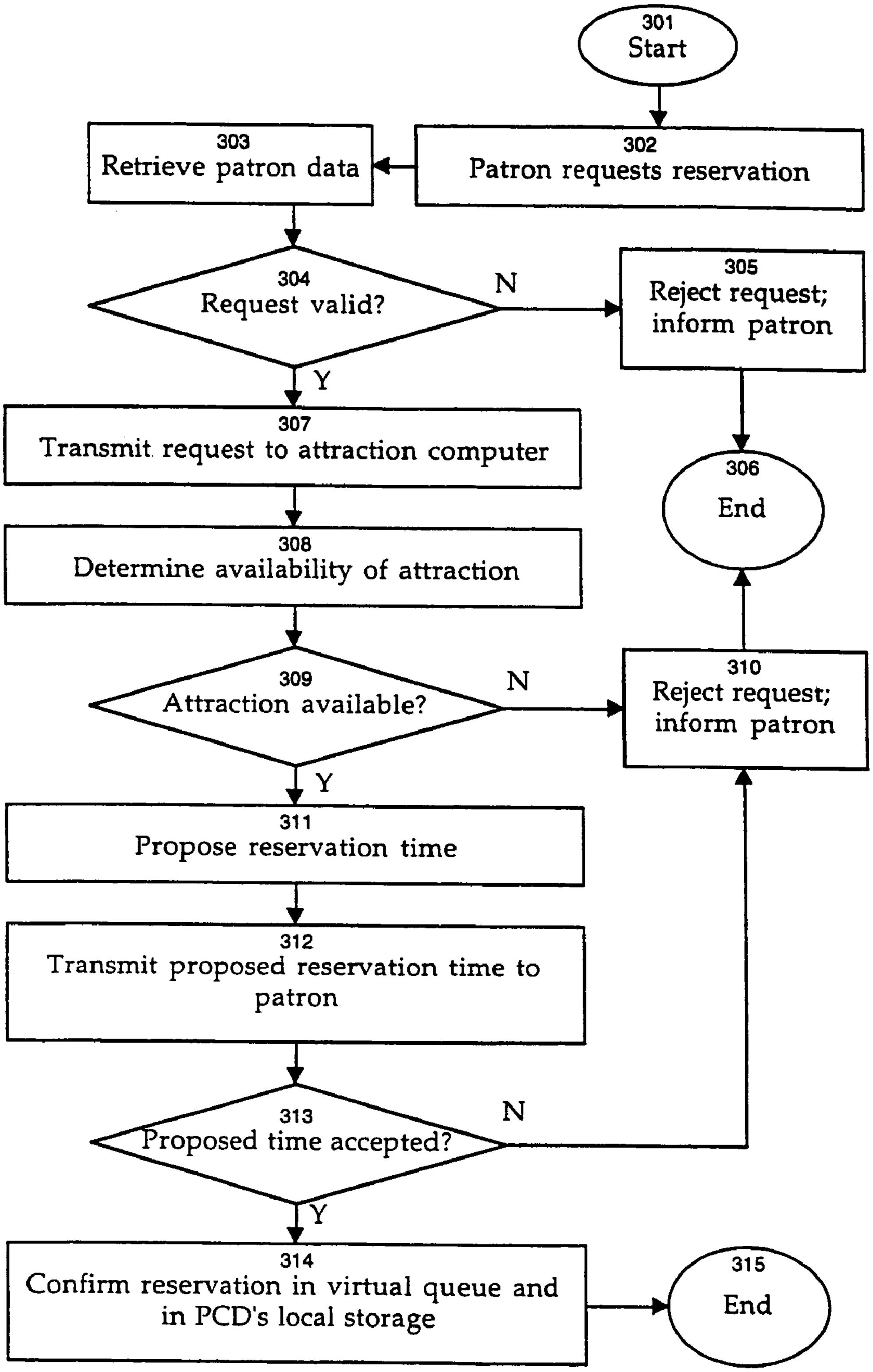
FIG. 3 is a flowchart showing a method of making a reservation according to the present invention.

The various components of system 100 operate to take reservation requests from patrons and schedule and confirm reservations. As patrons travel through the amusement park, they use PCDs 102 to request reservations for particular attractions in the park. Referring now to FIG. 3, there is shown a flowchart of the overall operation of system 100 in processing a reservation request from a patron. The steps shown in FIG. 3 are performed by various components of system 100. More detailed descriptions of various elements of the flowchart and the components that perform the described steps are provided below.

First, the patron requests 302 a reservation for a selected attraction by entering the request using user interface 201 of PCD 102. The request may specify a particular time of day that the patron is interested in, or it may simply request the next available time for attending the attraction.

In one embodiment, filtering and generation module 203 retrieves 303 patron information stored locally in information storage 202 and filters 304 or screens the request according to various heuristics in order to determine whether or not the request is valid.

If invalid, the request is rejected 305 and the patron is informed of the rejection. If valid, the request is transmitted 307 to attraction computer 101 for the requested attraction.

Request processor 209 in computer 101 determines 308 the availability of the attraction in accordance with the request. Attraction availability is determined based on attraction information stored in storage 213 (such as, for example, operating hours for the attraction), virtual queue 210 containing information describing pending reservations, and physical queue monitor 103 which provides information describing the physical queue for the attraction.

If processor 209 determines 309 that the attraction is not available, processor 209 rejects 310 the request. Computer 101 sends a message to PCD 102 to inform the patron that the attraction is unavailable.

If processor 209 determines 309 that the attraction is available 309, processor 209 determines 311 a proposed reservation time or position for the patron. The time or position of the proposed reservation may be based on a number of different factors, including the number of reservations held in the virtual queue 210, data from physical queue monitor 103 identifying the number of patrons physically present and waiting for access to the attraction, historical time/demand data, current actual throughput (number of patrons being served per unit time), predicted throughput, the number of individuals in the patron's party, and other static or dynamic performance information. This reservation time is temporarily held in virtual queue 210, awaiting confirmation from the patron.

Module 211 transmits 312 the message with the proposed reservation time to PCD 102.

Module 208 displays the proposed reservation time and name of the attraction to the patron via user interface 201, and prompts the patron to either confirm or reject the reservation. The patron is given a fixed period of time in which to confirm or reject the reservation by providing input to user interface 201. In one embodiment, during this time, the patron is not permitted to make additional reservation requests. The patron accepts or rejects the reservation by inputting a signal to PCD 102 via user interface 201; PCD 102 then transmits the signal back to attraction computer 101.

The patron's confirmation or rejection is transmitted back to attraction computer 101 using modules 207 and 211. If the patron does not specify confirmation within the fixed period of time, PCD 102 sends a timeout message to attraction computer 101, which considers the reservation to have been rejected. In an alternative embodiment, attraction computer 101 maintains a timeout counter to determine that no response has been received from PCD 102 after a predetermine time period, so that no timeout message need be transmitted from PCD 102 to computer 101.

If the proposed time is not accepted 313, the temporarily held reservation time is released in virtual queue 210, and the patron is informed 310 of the acknowledgment of his or her rejection of the proposed reservation.

If the proposed time is accepted 313, the reservation is confirmed 314 in both local reservation storage 206 and in the virtual queue 210 of attraction computer 101. Optionally, the patron may be informed that the reservation is confirmed.

When the reservation time of some attraction is approaching, PCD 102 alerts the patron with an audible message, beep, visual indication, or vibration. The patron and his or her group then proceed to the attraction, and enter.

PCD Operation

Figure 5:
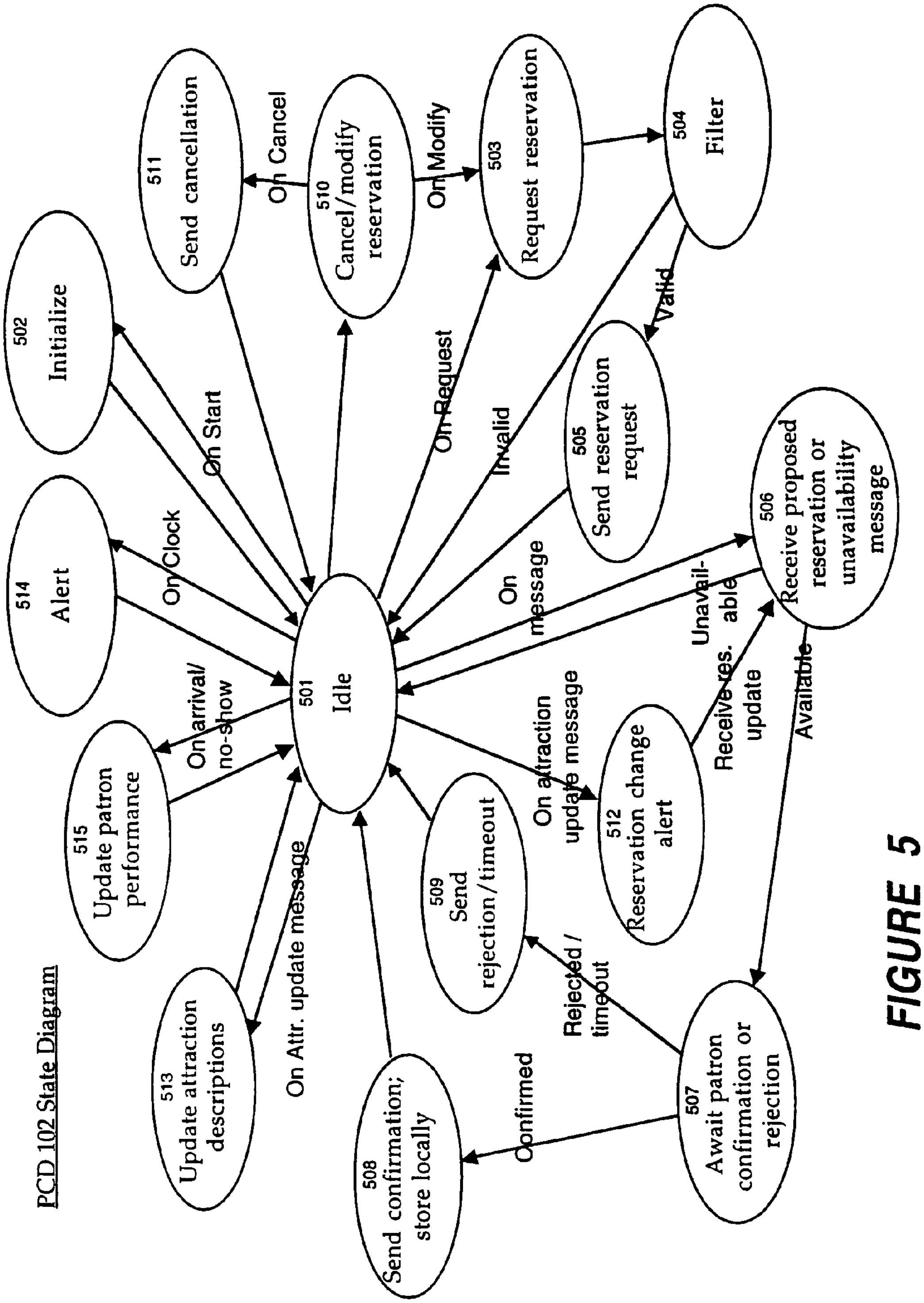
FIG. 5 is a state diagram showing operation of the PCD according to the present invention.

Referring now to FIG. 5, there is shown a state diagram of the operation of PCD 102 according to one embodiment of the present invention.

PCD 102 starts in an idle state 501. Various events may occur which trigger other states, as described below. During the idle state 501 the PCD 102 loops through a control loop and enters further states depending on system messages, message types indicated in messages received from attraction computers 101 (as explained below), internally generated messages, and clock events.

When PCD 102 is initially distributed to a patron, it enters an initialize state 502 controlled by initialization module 214. PCD 102 is activated, and its communication with network 105 is enabled, typically by exchanging initializing messages and handshaking with nodes in network 105. Attraction description information may be provided to PCD 102 for local storage in attraction descriptions 205. The patron is presented with a welcome message and is invited to enter information describing his or her group via user interface 201. Patron information typically includes the number of people in the group, their ages, heights, and attraction preferences. FIG. 5A shows a sample screen 519 for entry of such information for each member of the patron's group, including: fields 520 for entering name, age, height, and weight; checkboxes 521 for specifying health conditions; and checkboxes 522 for specifying attraction and seating preferences. Other items of patron information may also be included as may be relevant for the particular amusement park. Individual preferences, such as how far in advance of an upcoming reservation to alert the patron (for example, five minutes or ten minutes, or variable depending on distance to the attraction), may be specified. Buttons 523 are used for canceling, proceeding to the next member of the group, or indicating that the patron is done entering information. Once the information has been entered, it is stored as member records in patron information 202. In one embodiment, such information is also transmitted to storage 213 in attraction computers 101 so that computers 101 can access the information locally when processing reservations. In another embodiment, such information is transmitted to central attraction control interface 104 for centralized storage and access by connections to attraction computers 101. During initializing state 502, PCD 102 may also receive input of rules for use by request filtering module 203, or such rules may be preloaded in PCD 102 prior to distribution to patrons. PCD 102 returns to idle state 501.

Figure 5B:
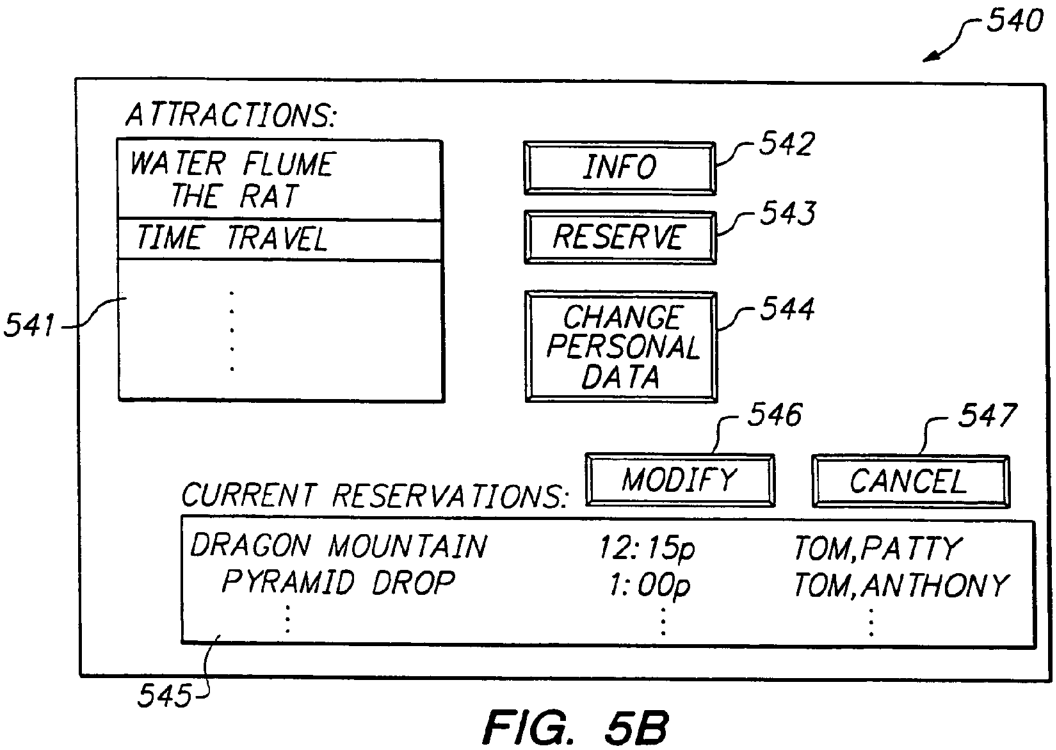
FIG. 5B is a sample screen for requesting reservations, obtaining information, and viewing, modifying or canceling previously-made reservations according to the present invention.

While in idle state 501, user interface 201 presents a screen 540, as shown in FIG. 5B, which includes a scrollable and/or pageable list 541 of available attractions, buttons 542 and 543 for obtaining information or generating reservation requests for selected attractions, a button 544 for changing patron information, a scrollable and/or pageable list 545 of previously-made reservations, and buttons 546 and 547 for modifying or canceling previously-made reservations. If desired, the patron may also be presented with a list of attractions that match the particular preferences of the members of the patron's group or that are in relative proximity to the patron's current location. The current location of the patron is determined by patron input to user interface 201, or in one embodiment it is obtained automatically using a global positioning system (GPS) (not shown) in a conventional manner, coupled to patron information storage 202. In this embodiment, GPS data describing the patron's current location in the park is matched against geographic location data for the attractions in the attraction description storage 205 to determine those attractions the patron is near. Activation of these screen elements by use of a pointing device 108 or touch-sensitive screen 109 causes PCD 102 to enter various states, as described below.

Figure 5C:
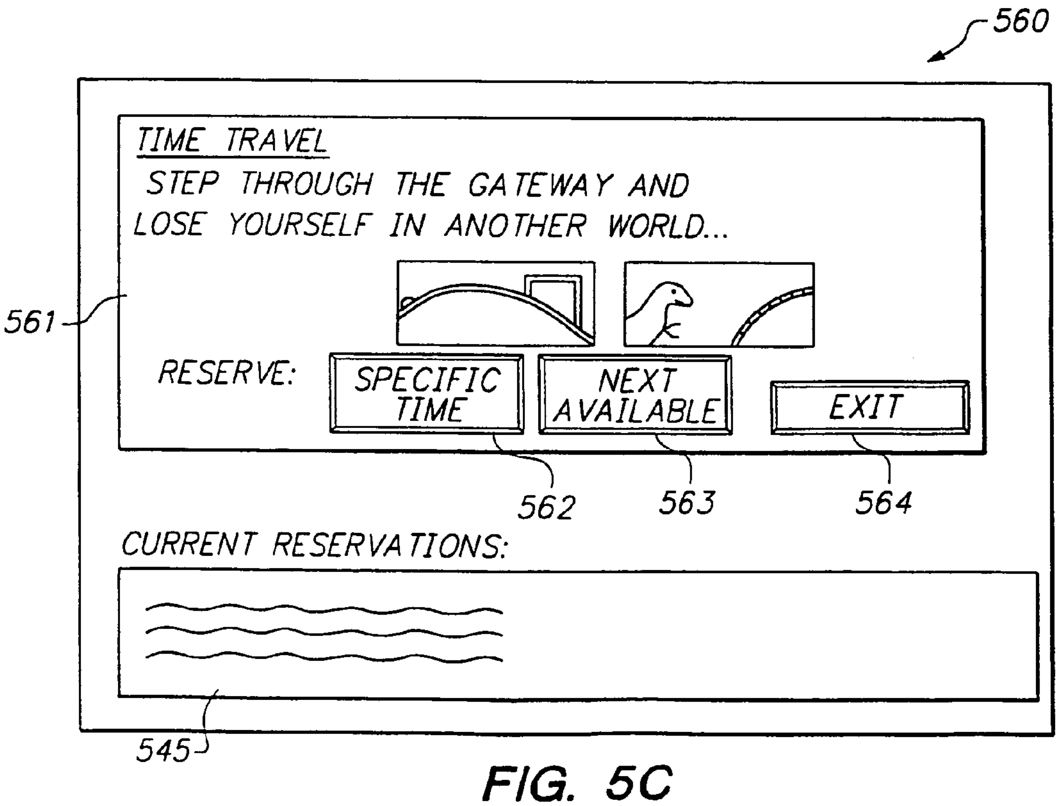
FIG. 5C is a sample screen for sending a reservation request according to the present invention.

A patron may request a reservation for a particular attraction as follows. The patron selects one of the attractions in list 541 using a pointing device. By clicking on button 542, the patron can obtain additional information such as a description, location, height or age restrictions, and the like, retrieved from local storage 206. Clicking on button 543 causes PCD 102 to enter state 503 for requesting reservations. FIG. 5C shows a sample display screen 560 for requesting a reservation for a selected attraction. Window 561 provides descriptions and pictures of the attraction. Button 562 allows the patron to request a specific time for the reservation. Button 563 requests the next available time. Button 564 exits the screen and returns PCD 102 to idle state 501. Optionally, screen 560 also provides a mechanism for the patron to indicate, if desired, which members of the patron's party are to be included in the reservation.

Once the reservation has been requested by the patron, PCD 102 enters state 504, where relevant information is retrieved and the reservation is filtered to determine its validity.

Figure 4:
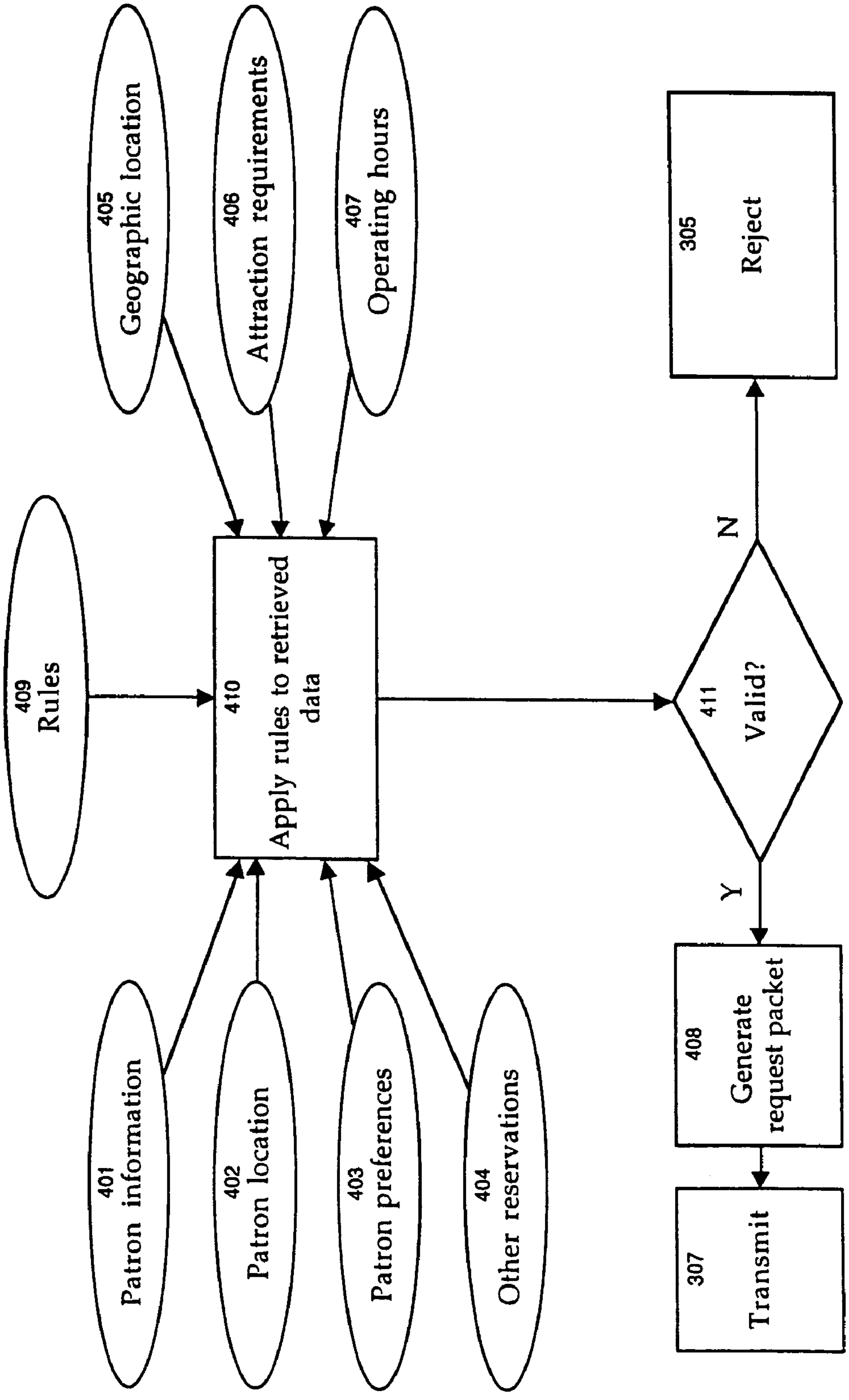
FIG. 4 is a flowchart showing a method of filtering a reservation request according to the present invention.

Referring now also to FIG. 4, there is shown a flowchart of the retrieval 303 and filtering 304 operations. In one embodiment, such operations are performed locally without the need for communication with an attraction computer 101, as follows. Module 203 retrieves 303 relevant information from storage 202, 205, and 206, including for example:

- patron information 401 describing how many people are in the patron's group, ages, heights, medical conditions, and the like from patron information 202;
- patron location 402 describing the patron's current location in the park, which may be derived automatically from Global Positioning System (GPS) information, or may be manually entered by the patron;
- patron preferences 403 specifying particular types or characteristics of attractions that the patron has indicated are preferable, as encoded in flags 225 of storage 202;
- other reservations 404 describing previously-made reservations by the patron from local reservation information 206;
- geographic location 405 of the requested attraction from attraction descriptions 205;
- restrictions or requirements 406 (such as age, height, medical conditions, and the like) for the requested attraction from attraction descriptions 205; and
- operating hours 407 for the requested attraction from attraction descriptions 205.

Once the relevant information has been retrieved, module 203 retrieves pre-programmed rules 409 for validity determination of reservation requests. Rules 409 are generally programmed into module 203 when PCD 102 is initialized, and specify how the retrieved data is to be processed to determine validity. For example, a rule might specify that the patron may not have more than five reservations at a time; or another rule may specify a maximum distance between the attractions for two successive reservations. Where PCD 102 is adapted to employ Global Positioning System (GPS) information, the patron may be limited to making reservations at attractions within a certain distance from their present position. Module 203 may also check, for example, that members of the group are of sufficient age and height to enjoy the selected attraction by comparing information in patron information storage 202 with the description data of the attraction in the attraction description storage 205. Module 203 may also ensure that no conflicting reservations have been made. Other processing based on locally-available information may also be performed to filter or otherwise validate the request.

Rules are applied 410 to the retrieved data and a determination is made 411 as to the validity of the reservation request. If the request is not valid, module 203 rejects 305 request and informs the patron of the rejection by displaying a message via user interface 201, preferably stating the reason for the rejection. PCD 102 then returns to the idle state 501. The patron may then enter a new request, or modify the existing request.

If the request is valid, PCD 102 proceeds to state 505. Request filtering module 203 generates 408 a reservation request message to transmit the request for processing by attraction computer 101. Referring now to FIG. 4A, there is shown a data structure 420 for a reservation request message according to one embodiment of the present invention. In one embodiment, the same data structure 420 is used for all messages in system 100, with differing types of messages being distinguished by unique values for MSG_TYPE 426. The request message preferably includes the following:

- PCD_ID 421 is a unique identification or serial number of the patron's PCD 102, allowing attraction computer 101 to identify the source of the request, and to the respond to the specific PCD 102 making the request.
- MSG_TYPE 426 indicates the type of message being sent. Unique codes identify reservation requests (REQUEST), responses (RESPONSE), rejections (REJECT), confirmations (CONFIRM), cancellations (CANCEL), timeouts (TIMEOUT), modifications (MODIFY), attraction information updates (ATTRACTION_UPDATE), reservation updates (RES_UPDATE), and other types of messages as may be useful. For request messages, MSG_TYPE 426 would in a preferred embodiment contain a REQUEST code.
- REQUEST _ID 422 is a unique identification number for the request generated by PCD 102. This enables PCD 102 to distinguish this specific request from others that the patron may have made or may make in the future, so as to enable correct identification of requests in the local reservation information storage 206, and handling of response from attraction computer 101.
- ATTRACTION_ID 423 is a unique identification number that identifies the attraction for which the reservation is intended. This enables the communications modules 207, 211 to properly direct the request to the appropriate attraction computer 101.
- TIME 424 is used optionally if the patron has specified a desired reservation time for attending the attraction.

- FLAGS 425 is used optionally to indicate some special requirements or other information derived from patron information 202 or from some special characteristics of the reservation request. For example, FLAGS 425 may indicate that one of the members of patron's group is disabled and requires wheelchair access to the attraction. Such information will be taken into account by attraction computer 101 when scheduling the reservation.

Data structure 420 may also include additional formatting as useful for the particular implementation of the system, such as byte counts, checksums, request length, and the like. It may also contain information describing past performance of the patron in keeping reservations, for use by attraction computer 101 in estimating ride probability, for example by including the patron's ride probability 253. Finally, in one embodiment, data structure 420 includes additional fields describing other reservations previously made by the patron. Attraction computer 101 can use this information to avoid scheduling conflicts with other reservations.

The module 203 passes the request to communications module 207. Communications module 207 formats the request into the necessary data format used in the wireless network 105, and then transmits 307 the request to communications module 211 in the corresponding attraction computer 101 through the wireless communications network 105. PCD 102 then awaits an acknowledgment from attraction computer 101 indicating that the request is being processed, and displays a message to inform the patron that a response is being processed. While the acknowledgment is being awaited, PCD 102 returns to idle state 501 so that other reservations may be made by the patron and other operations may be performed.

Figure 5D:
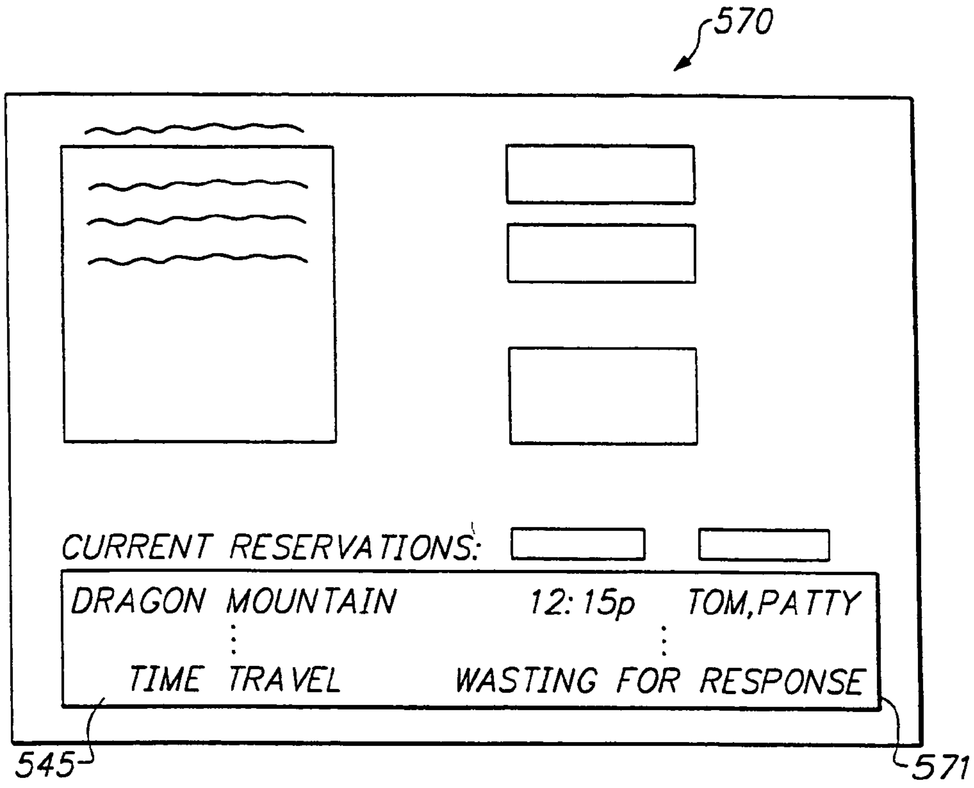
FIG. 5D is a sample screen for display while awaiting a response to a reservation request, according to the present invention.

FIG. 5D is a sample screen 570 after a reservation request has been transmitted. List 545 now includes item 571 showing the reservation request with an indication that PCD 102 is waiting for a response regarding the request.

Upon receipt of a message from an attraction computer 101, PCD 102 enters state 506 for receiving a response message. The message may contain a description of a proposed reservation time, or it may indicate that the attraction is unavailable. In one embodiment, response messages employ a data structure 420 similar to that shown in FIG. 4A, with the same fields. The response message thus includes the same unique PCD_ID 421, REQUEST _ID 422, and ATTRACTION_ID 423 fields, in order to allow PCD 102 to identify itself as the intended recipient of the response message, and match the response to the previously-submitted request. TIME 424 now contains the proposed reservation time generated by computer 101. FLAGS 425 indicate additional information that may be useful to PCD 102. For example, if the attraction is unavailable a flag in FLAGS 425 may so indicate. A reason code may also be encoded for such a response, so that the patron can be informed as to the reason for unavailability (for example: attraction closed, under height limit, over weight limit, reservation time not available, and the like). MSG_TYPE 426 contains a RESPONSE code.

Upon receipt of the response message by the communications module 207, PCD 102 sends an acknowledgment message if such is required by the selected protocol for communication across network 105. The response message is provided to the reservation confirmation module 208. Module 208 checks the REQUEST_ID to match it with a request stored in local reservation information storage 206, and the appropriate flag in FLAGS is checked to determine whether the request indicates availability or unavailability of the selected attraction.

If the response message indicates that the attraction is unavailable, PCD 102 so notifies the patron by displaying an on-screen message via user interface 201 on the display of PCD 102 explaining the reason for the rejection. PCD 102 then returns to the idle state 501, allowing the patron to request a reservation elsewhere or perform other operations.

Figure 5E:
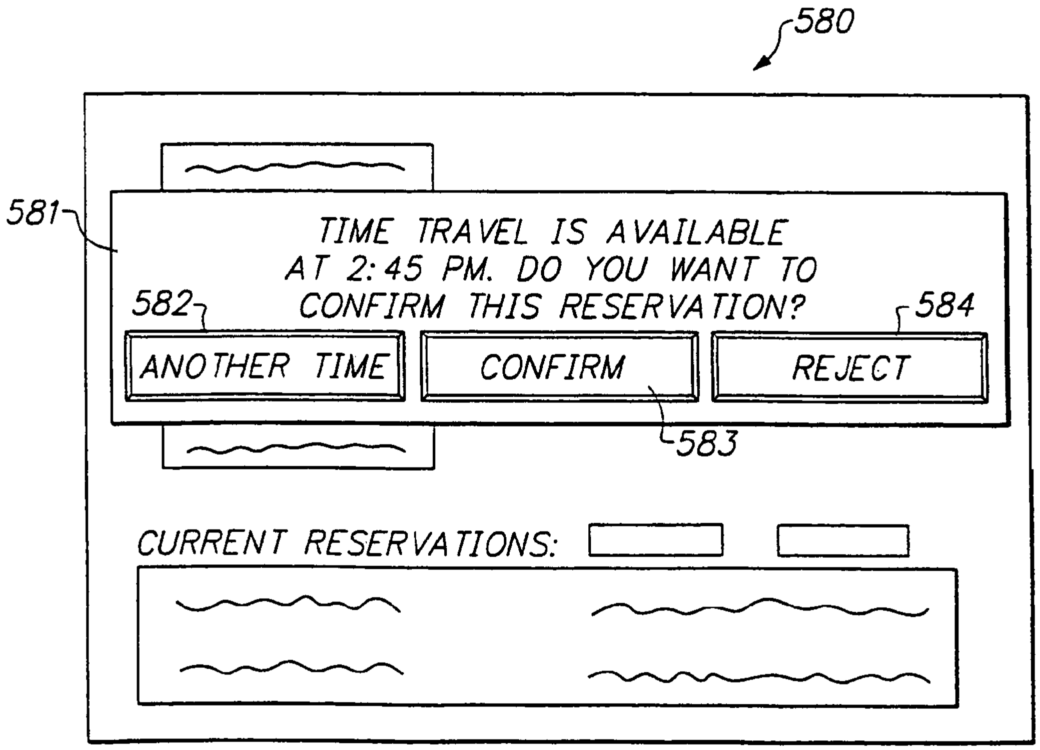
FIG. 5E is a sample screen including a dialog box for confirmation, rejection, or rescheduling of a proposed reservation time.

If the response message indicates that the attraction is available, PCD 102 proceeds to state 507 and presents an on-screen message to the patron informing him or her of the available time. Referring now to FIG. 5E, there is shown a sample screen 580 containing a message 581 informing the patron of the availability of the selected attraction at a particular time.

If the user presses Another Time button 582, PCD 102 prompts the patron to enter a new requested time, then proceeds to state 509. PCD 102 sends a message to computer 101 that the proposed reservation time is rejected-using data structure 420 with a MSG_TYPE 426 of REJECT. PCD 102 then proceeds to state 503 to generate a new reservation request with the time specified by the patron. In one embodiment, an additional MSG_TYPE of RESCHEDULE is provided to perform the rejection and new request in a single step. This approach has the advantage of allowing computer 101 to hold the previous reservation in a pending state until the new proposed time is processed, so that the patron does not lose the prior reservation if the new proposed time is not available. In all other respects, the new reservation request is handled in a similar manner to an ordinary reservation request with a specified requested time.

If the user presses Confirm button 583, PCD 102 enters state 508. A confirmation message is sent using data structure 420 with a MSG_TYPE 426 of CONFIRM. PCD 102 may await an acknowledgment signal if such is dictated by the particular communications protocols in use for network 105. PCD 102 also stores the confirmed reservation locally in local storage 206. PCD 102 then returns to idle state 501.

If the user presses Reject button 584, PCD 102 proceeds to state 509 to send a rejection message to computer 101 that the proposed reservation time is rejected, using data structure 420 with a MSG_TYPE 426 of REJECT. PCD 102 may await an acknowledgment signal if such is dictated by the particular communications protocols in use for network 105. PCD 102 then returns to idle state 501. If the user fails to press one of buttons 582, 583, or 584 within a predetermined time period, PCD 102 sends a TIMEOUT message and returns to idle state 501.

Referring again to FIG. 5B, previously-made reservations appear oh screen 540 in list 545. The patron may cancel a previously-made reservation by selected the reservation with an on-screen pointer and clicking on Cancel button 547. This causes PCD 102 to enter state 511, where it retrieves the REQUEST_ID for the selected reservation and sends a cancellation message to computer 101 that the previously-made reservation is canceled, using data structure 420 filled in appropriately for the selected reservation, with a MSG_TYPE 426 of CANCEL. PCD 102 may await an acknowledgment signal if such is dictated by the particular communications protocols in use for network 105. PCD 102 then returns to idle state 501.

The patron may modify a previously-made reservation by selecting the reservation with an on-screen pointer from list 545 and clicking on Modify button 546. This causes PCD 102 to retrieve the REQUEST_ID for the selected reservation, send a message to computer 101 that the previously-made reservation is canceled, using data structure 420 filled in appropriately for the selected reservation, with a MSG_TYPE 426 of CANCEL, and enter state 403 for requesting a new reservation for the selected attraction. The new reservation request is processed in a similar manner as described above for ordinary reservation requests. In one embodiment, an additional MSG_TYPE of MODIFY is provided to perform a provisional cancellation and new request in a single step. This approach has the advantage of allowing computer 101 to hold the previous reservation in a pending state until the new proposed time is processed, so that the patron does not lose the prior reservation if the new proposed time is not available.

Upon receipt of an ATTRACTION_UPDATE message, PCD 102 enters state 512. If applicable, patron is alerted and notified that some previously-made reservations must be modified as a result of changes to attraction information. Local attraction information 205 is modified if necessary. If applicable, PCD 102 proceeds to state 506 to receive a RES_UPDATE message indicating a new proposed time or attraction unavailability.

The reservation confirmation module 208 periodically and regularly checks the local reservation storage 206, and further accesses a system clock of PCD 102, to determine which reservations stored therein are within a specified amount of time from the current time. If the reservation time of some attraction is within the specified time, PCD 102 enters state 514 to alert the patron with an audible message, beep, visual indication, or vibration. The specified amount of alert time may be preconfigured with PCD 102, or may be established by the patron during initialization as described above. Alternatively, the amount of alert time may be dynamically varied as a function of the patron's distance to the attraction and estimated travel time, using GPS data. As described above, the current location of the patron is in one embodiment automatically updated using a GPS, and the location of the attraction is determined from attraction description storage 205. Estimated travel speed can be dynamically determined from the GPS data, or estimated predetermined values may be used. In this manner, the user is alerted with sufficient time to travel to the attraction in order to make the reservation.

The reservation alert issued by module 204 may take the form of a visual indication on user interface 201, optionally accompanied by an auditory indication such as a beep, voice message, or other distinctive sound. Module 204 may also alert the patron by use of vibrations as is known in the art with respect to pager alerts. This is particularly advantageous in a noisy environment when an auditory alert may not be heard by the patron, or where a visual alert may not be noticed. PCD 102 may await some confirmation from the patron to indicate that the alert has been noted (such as clicking on an onscreen button). The alert is then silenced and PCD 102 returns to the idle state 501. If desired, additional alerts may be provided if the GPS data indicates that the patron is not proceeding in the direction of the attraction, that patron is not proceeding to the attraction quickly enough to make the reservation time, or if the reservation has not been claimed at the appropriate time.

When the patron arrives at the attraction in fulfillment of a confirmed reservation, PCD 102 enters state 515. This situation is detected by means of a transmitter located at the attraction that signals patron's arrival to PCD 102. Similarly, if a reserved time passes and the patron does not show up at the attraction within a predetermined or flexible grace period, PCD 102 detects the failure to receive the arrival message and enters state 515. In either case, the reservation is removed from local storage 206 and patron performance information, stored in 202, is updated to reflect the patron's arrival or failure to arrive in time for the reservation.

PCD 102 may also receive Attraction Update messages providing information for updating the attraction descriptions stored in 205. Such messages are sent by attraction computer 101 responsive to some change in the status of the attraction, such as for example if an attraction is closed for repair. Upon receipt of such a message, PCD 102 enters state 513 to update local storage of attraction descriptions 205. In one embodiment, Attraction Update messages employ a data structure 420 as shown in FIG. 4A including the following:

- PCD_ID 421 is set to a unique value (e.g. NULL) that specifies that the message is to be sent to all PCDs 102, so that all PCDs 102 can make the appropriate changes to their attraction descriptions 205. The unique value is distinct from other values of PCD_ID 421 for particular PCDs.
- MSG_TYPE 426 is set to a unique ATTRACTION_UPDATE code.
- REQUEST_ID 422 is not applicable for Attraction Update messages.
- ATTRACTION_ID 423 is a unique identification number that identifies the attraction for which the information is being updated. This enables PCDs 102 to properly update the appropriate information.
- TIME 424 is used optionally to provide additional data regarding the attraction, such as for example a projected time for re-opening of the attraction.

FLAGS 425 specifies the particular information being updated and provides the updated information. For example, FLAGS 425 may indicate that an attraction is closed, as well as the particular reason for the closure. In one embodiment, after sending the attraction update message, computer 101 checks the contents of virtual queue 210 to determine whether any reservations need to be changed. It then sends reservation update messages to all PCDs 102 associated with such reservations. Reservation update messages are similar to RESPONSE messages described previously, but with a MSG_TYPE of RES_UPDATE, and a TIME proposing a new reservation time. Confirmation or rejection is awaited as described previously in connection with RESPONSE messages.

Referring again to FIG. 5B, the patron may change personal data by clicking on button 544. This may be necessary if, for example, the patron discovers that some element of data is incorrect or inaccurate. If the patron clicks on button 544, he or she is taken to screen 519 as described above in connection with FIG. 5A. Fields 520 and checkboxes 521 and 522 are filled in for the patron as he or she previously indicated, and changes may be made as appropriate. Once the patron is satisfied with the changes, he or she may click Done to exit screen 519 and return to screen 540.

Attraction Computer Operation

Figure 6:
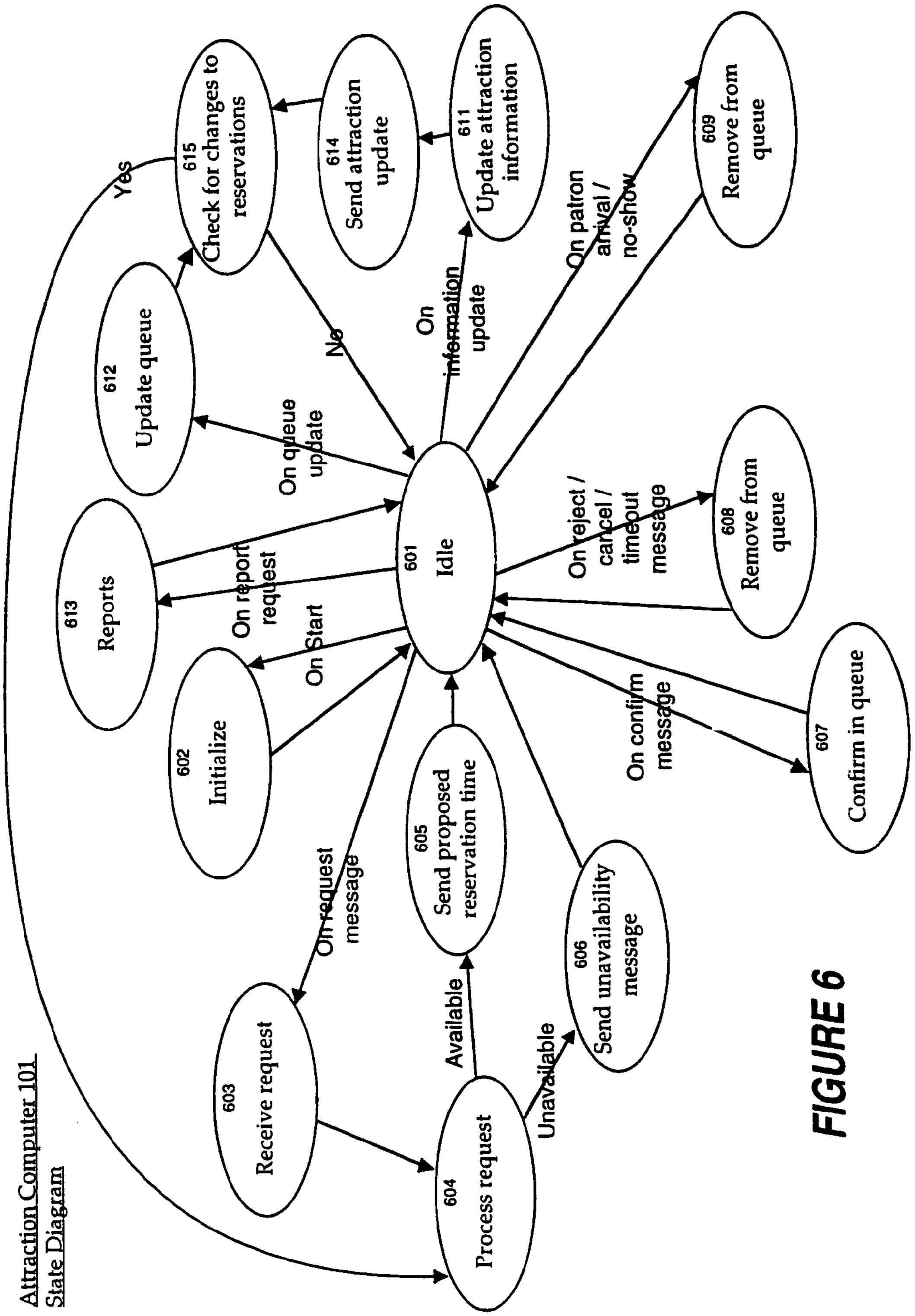
FIG. 6 is a state diagram showing operation of the attraction computer according to the present invention.

Referring now to FIG. 6, there is shown a state diagram of the operation of attraction computer 101 according to one embodiment of the present invention.

Computer 101 starts in an idle state 601. Various events may occur which trigger other states, as described below.

Upon startup, computer 101 enters an initialize state 602. Computer 101 is activated, virtual queue 210 is initialized, and attraction information is loaded into storage 213 either from some external source or by user entry via interface 104.

Upon receipt of a reservation request message from a PCD 102, computer 101 enters state 603 wherein communications module 211 receives the message over network 105. Communications module 211 is able to recognize messages addressed to computer 101 by reading the ATTRACTION_ID field 423 of incoming messages. Communications module 211 receives the request from communications module 207 and reformats the request as needed for handling by the request processor 209. Communications module 211 also sends an acknowledgment to PCD 102 that sent the request to indicate that the request is being processed.

Computer 101 then enters state 604 for processing the reservation request, as described below in connection with FIG. 7, for request processor 209 to determine whether the attraction is available or unavailable. If available, a proposed reservation time is determined and computer 101 enters state 605 for transmitting the proposed reservation time back to PCD 102 that initiated the request, and the proposed reservation is entered in virtual queue 210. Request processor 209 compiles the specified reservation time or position into a message using the received PCD_ID, ATTRACTION_ID, and REQUEST_ID, along with a flag in FLAGS indicating a proposed reservation time. This message is passed to the communications module 211. Module 211 then transmits the message with the proposed reservation time to PCD 102.

While the patron is deciding whether to confirm or reject the proposed reservation, attraction computer 101 in one embodiment holds the proposed reservation time in the virtual queue 210, so that if other patrons request reservations at the same attraction, they will be not be given proposed reservation times that conflict with the first patron's proposed reservation time. However, this may cause a gap in virtual queue 210 if the first patron rejects the proposed reservation. In one embodiment, this gap will later be filled by one or more other patrons requesting reservations. In an alternative embodiment, a probability of confirmation of reservation is determined based on some predetermined factors such as, for example, the patron's past behavior in rejecting or confirming reservations, which information is tracked by the patron's PCD 102 and included in the reservation request as additional ride probability parameter, as discussed above. Reservation times may then be "overbooked" by attraction computer 101 to the extent permitted by the determined probabilities of confirmation for the patrons requesting the attraction. For example, the average ride probability for all future reservations from the current time may be computed, and used, in conjunction with throughput and cycle time values, to determine the next available reservation time or position.

In one embodiment, computer 101 also starts a timeout counter so that the proposed reservation can be canceled if no response is received from the patron within a predetermined time period. In another embodiment, no such counter is needed, since PCD 102 sends TIMEOUT messages when the patron fails to respond. Computer 101 then returns to idle state 601 to await confirmation or rejection of the proposed reservation.

If, in state 604, computer 101 determines that the attraction is unavailable, it enters state 605 for transmitting an unavailability response to PCD 102 and returns to idle state 601. The processor 209 generates a rejection message according to the data structure shown in FIG. 4A, using the PCD_ID, REQUEST_ID, and ATTRACTION_ID information from the request, and a flag in FLAGS 425 indicating that the request was rejected. As described previously, a reason code may also be encoded for such a response, so that the patron can be informed as to the reason for unavailability (for example: attraction closed, reservation time not available, and the like). Thus, for example, if the attraction is closing in one hour and there are sufficient reservations in the virtual queue 210 to keep the attraction full until closing, an explanation of these circumstances may be encoded in FLAGS 425 and conveyed to the patron via user interface 201. This message is passed to the communications module 211 for formatting and transmission to module 207 of PCD 102.

As described previously, messages sent in states 605 and 606 are response messages formatted according to the data structure shown in FIG. 4A.

Upon receipt of a confirmation message from PCD 102, computer 101 enters state 607. Communications module 211 sends an acknowledgment message if such is required by the selected protocol for communication across network 105. The appropriate flag in virtual queue 210 is set to indicate that the reservation is now confirmed. Computer 101 then returns to idle state 601.

Upon receipt of a rejection, timeout, or cancel message from PCD 102, computer 101 enters state 608. Communications module 211 sends an acknowledgment message if such is required by the selected protocol for communication across network 105. The reservation record is removed from virtual queue 210. Computer 101 then returns to idle state 601.

When a patron arrives at the attraction in fulfillment of a reservation, a sensor detects patron's arrival. The patron and his or her group preferably enter by way of a separate, entry dedicated for users of system 100. Various mechanisms at or near this entry may be employed to detect the patron's arrival at the attraction. In one embodiment, as the patrons enter the attraction, they may pass their communication device by a transmitter/receiver. The transmitter signals PCD 102 to identify itself; PCD 102 responds with a signal including its PCD_ID, thereby signaling arrival of the patron. The arrival signal is received and sent to attraction computer 101, and the reservation for that particular patron is identified in the virtual queue 210 using the PCD_ID and REQUEST_ID. Attraction computer 101 enters state 609.

Similarly, if a reserved time passes and the patron does not show up within a predetermined or flexible grace period, attraction computer 101 enters state 609.

In either case, the reservation is removed from virtual queue 210. Computer 101 then returns to idle state 601.

Attraction information 213 may be changed in response to signals from central attraction control interface 104. Upon receipt of such signals, computer 101 enters state 611, receives the updated information, and changes information in 213 as appropriate. Computer 101 then sends 614 ATTRACTION_UPDATE messages to PCDs 102 containing the updated information, and checks 615 whether any changes to reservations in virtual queue 210 are necessitated by the update. If so it returns to state 604 to generate a proposed reservation time or send an unavailability message as previously described.

When physical queue monitor 103 detects changes in the physical queue that necessitate changes in virtual queue 210, or when attraction information 611 indicates a problem or other change that necessitates such a change, queue updater 212 causes computer 101 to enter state 612. The virtual queue 210 is updated to account for the changes. Computer 101 then checks 615 whether any changes to reservations in virtual queue 210 are necessitated by the update. If so, it returns to state 604 to generate a proposed reservation time or send an unavailability message as previously described.

Park staff may request reports through interface 104. Such reports may indicate relevant historical analytical, and statistical data regarding operations of attractions 101. For example, throughput graphs, patron performance figures, and relative physical/virtual queue load graphs may be provided. When such reports are requested, computer 101 enters state 613, displays and/or prints reports, and returns to idle state 601.

Figure 7:
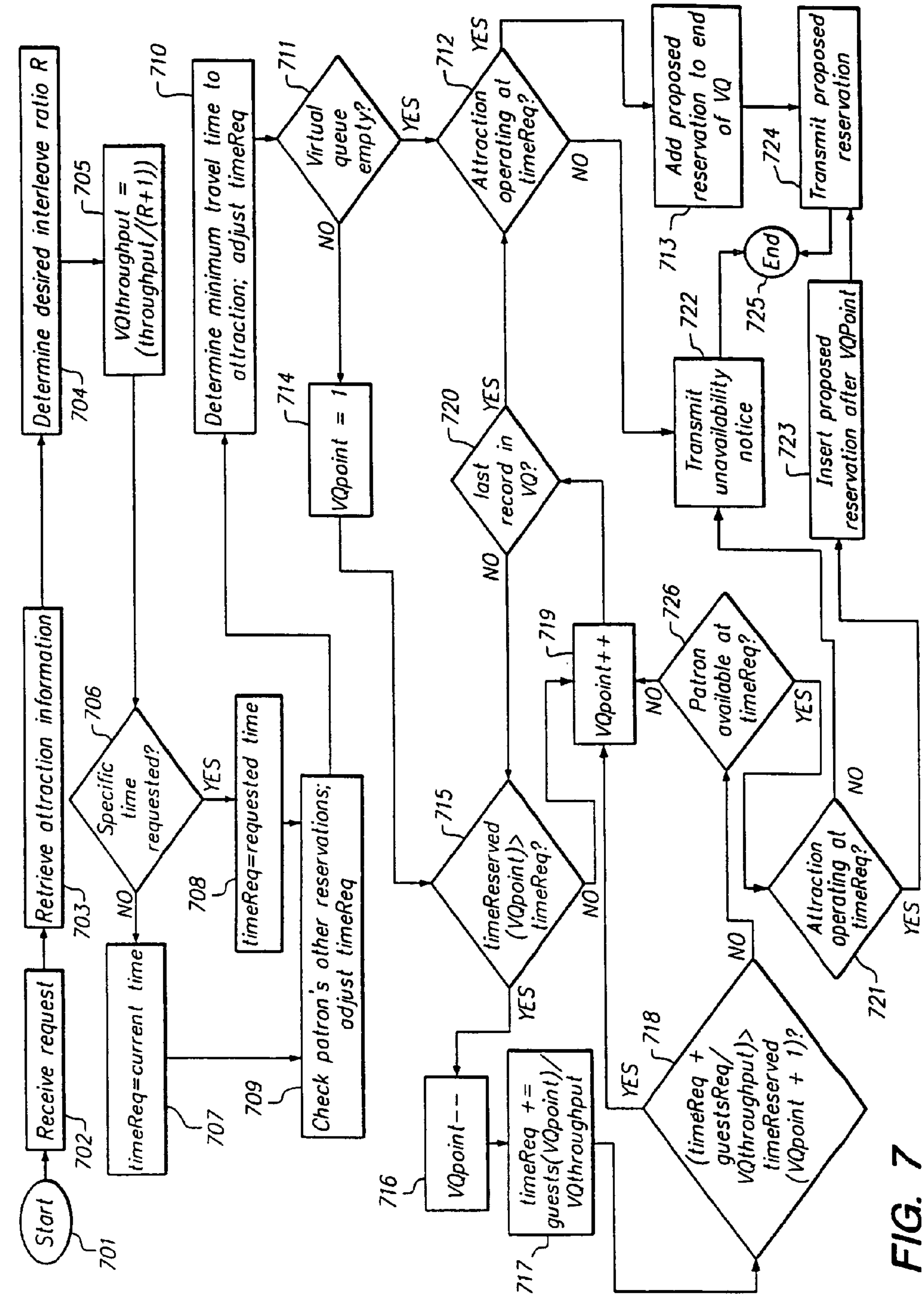
FIG. 7 is a flowchart showing a method of processing requests for reservations.

Referring now to FIG. 7, there is shown a flowchart of request processing according to one embodiment of the present invention. The steps of FIG. 7 are preferably performed by request processor 209 of the computer 101 corresponding to the requested attraction. In general, the steps of FIG. 7 describe a method of determining an earliest possible time to schedule a proposed reservation in virtual queue 210. This is done by traversing virtual queue 210 to find a "gap" large enough to schedule a new proposed reservation for the patrons making the request. If no such gap is found, the proposed reservation is added to the end of virtual queue 210.

Processor 209 receives 702 the request from communications module 211. It then retrieves 703 attraction information from storage 213, including throughput, downtime, current status, and the like, as described above in connection with FIG. 2E. Processor 209 determines 704 a desired interleave ratio for admitting patrons from the physical and virtual queues. Typically, such determination is made based on several factors, including for example the size of the physical queue (determined by physical queue monitor 103), staffing, throughput, and the like. The interleave ratio is expressed as R, where R is the number of persons to be admitted from the physical queue for each person admitted from the virtual queue. For example, if R=2, two persons are admitted from the physical queue for every person admitted from the virtual queue. Computer 101 may vary R dynamically depending on the relative sizes of the physical and virtual queues. R may be fractional.

Processor 209 determines 705 the effective throughput for the virtual queue by taking into account the interleave ratio R to allow for admission of patrons from the physical queue. Thus, the effective throughput is $$VQthroughput=throughput/(R+1) \quad \text{(Eq. 1)}$$

where throughput is determined from estimated, projected, current, or historical figures, and is measured as number of guests that can be admitted per unit time. For example, if throughput is 120 guests per hour, and the interleave ratio (R) is 2:1, VQthroughput is 120/(2+1)=40. Thus, 40 guests can be admitted from virtual queue 210 per hour. In alternative embodiments, other factors may also be employed in determining VQthroughput. For example, VQthroughput can be reduced by estimated downtime percentages, or it may take into account granularity in admissions due to higher cycle capacities, or it may be adjusted according to variations in staffing for the attraction.

Processor 209 determines 706 whether the patron requested a specific time for the reservation. A variable called timeReq is set 708 to the specific time if requested, or 707 to the current time if no specific time was requested. If PCD 102 has transmitted information describing other reservations previously made by the patron, as may be optionally provided in request message data structure 420, processor 209 then checks 709 whether other reservations previously made by the patron conflict with the time specified by timeReq; if so, timeReq is adjusted to avoid the conflict.

Processor 209 then determines 710 minimum travel time for the patron to get to the requested attraction, based on GPS data comparing coordinates of the patron (or where the patron will be after fulfilling prior reservations) and of the attraction, together with estimated travel speed of the patron, or based on manually entered information. Processor 209 also optionally checks whether the patron will have sufficient time to reach any previously-made reservations that occur after timeReq (based on distances between attractions). If necessary, timeReq is adjusted to account for travel time.

Processor 209 determines 711 if virtual queue 210 is empty, indicating that no other reservations have been made for this attraction. If so, processor 209 checks 712 whether the attraction is scheduled to be operating at timeReq, based on stored information or current status information. If not, processor 209 directs communications module 211 to transmit 722 an unavailability message. In one embodiment of the present invention, processor 209 will instead set timeReq to the next available operating time for the attraction (if any) and return to 709.

If processor 209 determines in 712 that the attraction is operating at timeReq, it adds 713 a proposed reservation to the end of virtual queue 210 and directs module 211 to transmit 724 the proposed reservation to the patron's PCD 102.

If processor 209 determines in 711 that virtual queue 210 is not empty, it searches for a suitable "gap" in virtual queue 210 to insert a new proposed reservation for the request, as follows. Processor 209 sets 714 a pointer called VQpoint to 1, in order to point to the second record in virtual queue 210 (since the records are indexed from 0 to N-1, where N is the total number of records). Processor 209 checks 715 whether the reserved time for the record indexed by VQpoint is later than timeReq. If the reserved time is not later than timeReq, processor 209 advances to the next record by incrementing 719 VQpoint by one and checking 720 whether the last record has been reached. If the last record has not been reached, processor 209 returns to 715. If the last record has been reached, processor 209 proceeds to determine 712 if the attraction is operating at that time, and adds 713 the reservation to the end of virtual queue as described previously.

If processor 209 determines in 715 that the reserved time for record VQpoint is later than timeReq, this means it has passed the point in virtual queue 210 where the requested reservation should be inserted. Thus, it decrements 716 VQpoint by 1 to point to the immediately preceding record. It then determines whether there is a "gap" between record VQpoint and the next record. In other words, processor 209 determines whether there is sufficient time between the two reservations to allow insertion of the new reservation request. This determination is made by first determining 717 how long it will take for patrons for reservation VQpoint to be admitted to the attraction, using VQthroughput so as to account for admission of patrons from the physical queue as well. This amount of time is represented by:

$$t1=\text{guests}(VQpoint)/VQthroughput \quad \text{(Eq. 2)}$$

where guests(VQpoint) represents the number of guests included in reservation VQpoint, and VQthroughput is the value calculated earlier in 705 timeReq is increased by the amount determined by Eq. 2, so that timeReq now indicates the time at which the attraction is able to admit the patrons making the request.

Processor 209 then determines 718 whether there is enough time between timeReq and the next reserved time to admit the new patrons along with a sufficient number of patrons from the physical queue. Thus, processor 209 calculates $$t2=timeReq+(guestsReq/VQthroughput) \quad \text{(Eq. 3)}$$

where guestsReq represents the number of guests included in the reservation request. The value determined by Eq. 3 is compared to the reserved time of the next reservation, represented by timeReserved(VQpoint+1). If the value from Eq. 3 is greater, there is no room for the new reservation at this point in virtual queue 210 and processor 209 returns to 719.

If the value from Eq. 3 is less than or equal to timeReserved (VQpoint+1), there is room for the new reservation. If PCD 102 has transmitted information describing other reservations previously made by the patron, processor 209 checks 726 the timing of these other reservations to determine whether he or she is available at the time specified by timeReq, and may optionally check whether the patron will have sufficient time to reach any previously-made reservations that occur after the new reservation (based on distances between attractions). If the patron is unavailable or will not have sufficient time to reach other reservations, processor 209 returns to 719 to search for another time slot.

If processor 209 determines that the patron is available, it checks 712 whether the attraction is scheduled to be operating at timeReq, based on stored information or current status information. If not, processor 209 directs communications module 211 to transmit 722 an unavailability message. In one embodiment of the present invention, processor 209 will instead set timeReq to the next available operating time for the attraction (if any) and return to 709.

If processor 209 determines in 721 that the attraction is operating at timeReq, it inserts 723 a proposed reservation at VQpoint+1 in virtual queue 210 and directs module 211 to transmit 724 the proposed reservation to the patron's PCD 102.

Other embodiments may be used in place of the method described by FIG. 7. In particular, one embodiment adjusts Eqs. 2 and 3 to account for probability of patrons not showing up for reservations. As discussed previously, a ride probability may be maintained for patrons or for individual reservations, representing an estimated probability that the patron will show up for the reservation. Virtual queue 210 may then be "overbooked" by a certain amount to take into account these no-shows. Eq. 2 can thus be rewritten as $$t1=(\text{guests}(VQpoint)/VQthroughput)*(rideProb(VQpoint)/100) \quad \text{(Eq. 4)}$$

where rideProb(VQpoint) is the ride probability for record VQpoint. Similarly, Eq. 3 can be rewritten as $$t2=timeReq+((guestsReq/VQthroughput)*(rideProbReq/100)) \quad \text{(Eq. 3)}$$

where rideProbReq is the ride probability for the requested reservation. Thus, this technique essentially books extra reservations with the expectation that some percentage of patrons will fail to show up for their reservations.

The above description depicts merely one embodiment of the present invention. Other techniques and methods could be employed without departing from the spirit or essential characteristics of the present invention. For example, PCD 102 may be implemented to not transmit information regarding previously-made reservations when a new reservation request is transmitted. In this case, processor 209 does not check 726 whether the patron is available at timeReq, but such checking is done at PCD 102 after the proposed reservation is received by PCD 102. Then, if the patron is not available, PCD 102 automatically transmits a new request with a later TIME value.

In summary, the present invention provides a system including a plurality of PCDs 102 operating in conjunction with one or more attraction computers 101 to provide for remote scheduling of reservations by patrons for various attractions or services throughout a facility. This enables patrons to efficiently use their time while at the facility, increasing the number of attractions or services visited by the patrons, thereby increasing their enjoyment of the facility. The present invention further increases the facility's utilization of its resources, including improved allocation of staff members, and other resources. Thus, the facility experiences greater patron satisfaction, increased business, and profitability.

What is claimed is:

1. A system for assigning and managing patron reservations to one or more of a plurality of attractions, the system comprising:

a plurality of attraction computers, each attraction computer associated with at least one attraction and configured to maintain status information about its corresponding attraction;

a wireless data device configured to receive a user selection for a reservation request, the reservation request specifying a particular attraction and including one or more criteria for the requested reservation, the wireless data device further configured to communicate the reservation request over a wireless network; and a host computer configured to receive reservation requests from the wireless data device, and to communicate with the attraction computers to obtain status information about the attractions, wherein, responsive to a reservation request from the wireless data device, the host computer is configured to determine a reservation for the user based at least in part on the criteria for the requested reservation and the status information about the attraction specified in the reservation request.

2. The system of claim 1, wherein the host computer is further configured to communicate the reservation to the wireless data device via a wireless network.

3. The system of claim 1, wherein the criteria for the requested reservation include a proposed time for the reservation.

4. The system of claim 1, wherein the criteria for the requested reservation include a number of persons for the reservation.

5. The system of claim 1, wherein the attraction computers are located at the corresponding attraction.

6. A method for assigning and managing patron reservations to one or more of a plurality of attractions, the method comprising:

polling one or more attraction computers to obtain status information about one or more attractions, each attraction computer associated with at least one attraction and configured to maintain status information therefor;

receiving a reservation request from a wireless data device over a wireless network, the reservation request specifying a particular attraction and including one or more criteria for the requested reservation;

responsive to receiving the reservation request from the wireless data device, determining a reservation based at least in part on the criteria for the requested reservation and the status information about the attraction specified in the reservation request; and communicating the reservation to the wireless data device.

7. The method of claim 6, wherein the criteria for the requested reservation include a proposed time for the reservation.

8. The method of claim 6, wherein the criteria for the requested reservation include a number of persons for the reservation.

9. The method of claim 6, wherein the attraction computers are located at the corresponding attraction.

10. A computer program product for assigning and managing patron reservations to one or more of a plurality of attractions, the computer program product comprising a computer-readable medium containing computer program code for performing the method comprising:

polling one or more attraction computers to obtain status information about one or more attractions, each attraction computer associated with at least one attraction and configured to maintain status information therefor;

receiving a reservation request from a wireless data device over a wireless network, the reservation request specifying a particular attraction and including one or more criteria for the requested reservation;

responsive to receiving the reservation request from the wireless data device, determining a reservation based at least in part on the criteria for the requested reservation and the status information about the attraction specified in the reservation request; and communicating the reservation to the wireless data device.

11. The computer program product of claim 10, wherein the criteria for the requested reservation include a proposed time for the reservation.

12. The computer program product of claim 10, wherein the criteria for the requested reservation include a number of persons for the reservation.

13. The computer program product of claim 10, wherein the attraction computers are located at the corresponding attraction.

* * * * *